US010893556B2

(12) United States Patent
Cho et al.

(10) Patent No.: US 10,893,556 B2
(45) Date of Patent: Jan. 12, 2021

(54) METHOD AND APPARATUS FOR SUPPORTING LOCAL IP ACCESS IN A FEMTO CELL OF A WIRELESS COMMUNICATION SYSTEM

(75) Inventors: Song Yeon Cho, Seoul (KR); Chae Gwon Lim, Seoul (KR); Sung Oh Choi, Suwon-si (KR); Beom Sik Bae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 173 days.

(21) Appl. No.: 12/770,322

(22) Filed: Apr. 29, 2010

(65) Prior Publication Data

US 2010/0278108 A1 Nov. 4, 2010

(30) Foreign Application Priority Data

Apr. 30, 2009 (KR) .................... 10-2009-0038428
Apr. 30, 2009 (KR) .................... 10-2009-0038514
Oct. 16, 2009 (KR) .................... 10-2009-0098994

(51) Int. Cl.
*H04L 12/46* (2006.01)
*H04W 76/12* (2018.01)
(Continued)

(52) U.S. Cl.
CPC ......... *H04W 76/12* (2018.02); *H04L 12/4633* (2013.01); *H04L 29/12735* (2013.01);
(Continued)

(58) Field of Classification Search
CPC . H04W 76/022; H04W 84/045; H04W 76/02; H04W 40/22; H04W 8/082;
(Continued)

(56) References Cited

U.S. PATENT DOCUMENTS

2005/0064889 A1 3/2005 Haumont
2007/0195774 A1* 8/2007 Sherman et al. ............. 370/392
(Continued)

FOREIGN PATENT DOCUMENTS

EP    1 983 771    10/2008
RU    2323545      4/2008
(Continued)

OTHER PUBLICATIONS

S2-092031, "Two Local IP Access Architecture Base Lines with IP Addresses Assigned from EPC", Mar. 30-Apr. 3, 2009.*
(Continued)

*Primary Examiner* — Salvador E Rivas
(74) *Attorney, Agent, or Firm* — The Farrell Law Firm, P.C.

(57) ABSTRACT

A method and apparatus for providing a local IP access service to a User Equipment (UE) attached to a femtocell including a Packet Data Network (PDN) gateway function in a wireless communication system. A method includes receiving a service request from a User Equipment (UE), transmitting an initial UE message including information on a local gateway to a Mobility Management Entity (MME), storing bearer information carried in an initial context setup request transmitted by the MME, receiving a Packet Data Network (PDN) connectivity request from the UE, forwarding the PDN connectivity request to the MME, receiving a create session request from the MME, and establishing a radio bearer with the local gateway, the local gateway being co-located with the femtocell.

8 Claims, 24 Drawing Sheets

(51) Int. Cl.
*H04L 29/12* (2006.01)
*H04W 88/18* (2009.01)
*H04W 84/04* (2009.01)
*H04W 8/08* (2009.01)
*H04W 88/16* (2009.01)

(52) U.S. Cl.
CPC ......... *H04L 61/2592* (2013.01); *H04W 8/082* (2013.01); *H04W 84/045* (2013.01); *H04W 88/16* (2013.01); *H04W 88/182* (2013.01)

(58) Field of Classification Search
CPC ............. H04L 65/1069; H04L 61/2592; H04L 29/12735; H04L 12/4633
See application file for complete search history.

(56) References Cited

U.S. PATENT DOCUMENTS

| | | | |
|---|---|---|---|
| 2007/0243872 | A1 | 10/2007 | Gallagher et al. |
| 2008/0076393 | A1 | 3/2008 | Khetawat et al. |
| 2008/0254768 | A1 | 10/2008 | Faccin |
| 2009/0022124 | A1* | 1/2009 | Faccin ........................ 370/338 |
| 2009/0043902 | A1 | 2/2009 | Faccin |
| 2009/0232019 | A1* | 9/2009 | Gupta .................. H04L 12/287 370/252 |
| 2010/0008234 | A1 | 1/2010 | Ulupinar et al. |
| 2010/0054222 | A1* | 3/2010 | Rune ................ H04L 29/12066 370/338 |
| 2010/0227627 | A1 | 9/2010 | Ishii et al. |
| 2010/0272013 | A1* | 10/2010 | Horn ................... H04W 76/022 370/328 |
| 2010/0275086 | A1* | 10/2010 | Bergquist et al. ............ 714/748 |
| 2010/0309886 | A1* | 12/2010 | Vikberg et al. ............... 370/332 |
| 2010/0322128 | A1* | 12/2010 | Becker et al. ................ 370/312 |
| 2010/0330959 | A1* | 12/2010 | Mildh et al. .................. 455/410 |
| 2011/0038318 | A1* | 2/2011 | Parsons et al. ............... 370/328 |
| 2012/0076047 | A1* | 3/2012 | Turanyi ................. H04W 76/02 370/254 |

FOREIGN PATENT DOCUMENTS

| | | |
|---|---|---|
| WO | WO 2008/118388 | 10/2008 |
| WO | WO 2009/028209 | 3/2009 |
| WO | WO 2009/043209 | 4/2009 |
| WO | WO 2010/006206 | 1/2010 |
| WO | WO 2010/121771 | 10/2010 |
| WO | WO 2010/123643 | 10/2010 |
| WO | WO 2010/128815 | 11/2010 |

OTHER PUBLICATIONS

3GPP, "TS 23.401 v.8.5.0" Mar. 2009, pp. 1-225.*
TD S2-092308, "Local IP access baseline solution for EHNB", Mar. 30-Apr. 3, 2009.*
S2-091989, "Architecture alternative for Local IP Access", Mar. 30-Apr. 3, 2009.*
3GPP, "TS 23.401 v.8.5.0" Mar. 2009, pp. 1-225 (Year: 2009).*
TD S2-092308, "Local IP access baseline solution for EHNB", Mar. 30-Apr. 3, 2009 (Year: 2009).*
S2-091989, "Architecture alternative for Local IP Access", Mar. 30-Apr. 3, 2009 (Year: 2009).*
Samsung, "Local IP Access to Internet", TD S2-092054, 3GPP TSG SA WG2 Meeting #72, Apr. 3, 2009.
Nortel, "Local IP Access", TD S2-092355, 3GPP TSG WG2 Meeting #72, Apr. 3, 2009.
European Search Report dated Jun. 3, 2015 issued in counterpart application No. 10769971.2-1855, 7 pages.
Russian Office Action dated Jul. 2, 2015 issued in counterpart application No. 2011143727/08, 15 pages.
Qualcomm Europe, "Local IP Access baseline solution for EHNB", TD S2-092308, 3GPP TSG SA WG2 Meeting #72, Mar. 30-Apr. 3, 2009.
Japanese Office Action dated Jan. 6, 2015 issued in counterpart application No. 2014-043620.
Samsung, "Open Issues and Solution for LIPA Service", S2-093420, 3GPP TSG SA WG2 Meeting #73, May 11-15, 2009, 6 pages.
Qualcomm Europe, "Local IP Access Baseline for EHNB", S2-090912 3GPP TSG SA WG2 Meeting #71, Feb. 16-20, 2009, 4 pages.
Qualcomm Europe, "TS22.220 Local IP Access", S1-084074, 3GPP TSG-SA1 #43, Nov. 17-21, 2008, 1 page.
3rd Generation Partnership Project; Technical Specification Group Services and System Aspects; Service Requirements for Home NodeBs and Home eNodeBs (Release 9), 3GPP TS 22.220 V9.0.0, Mar. 24, 2009, 22 pages.
Japanese Office Action dated Aug. 8, 2016 issued in counterpart application No. 2015-166632, 6 pages.
European Search Report dated Feb. 14, 2019 issued in counterpart application No. 18210200.4-1215, 6 pages.

* cited by examiner

METHOD AND APPARATUS FOR SUPPORTING LOCAL IP ACCESS IN A FEMTO CELL OF A WIRELESS COMMUNICATION SYSTEM

PRIORITY

This application claims priority under 35 U.S.C. § 119(a) to Korean Patent Application No. 10-2009-0038428, filed on Apr. 30, 2009, Korean Patent Application No. 10-2009-0038514, filed on Apr. 30, 2009, and Korean Patent Application No. 10-2009-0098994, filed on Oct. 16, 2009, the contents of which are incorporated herein by reference.

BACKGROUND OF THE INVENTION

1. Field of the Invention

The present invention relates generally to wireless communications and, in particular, to a method and apparatus for efficiently providing a local Internet Protocol (IP) access service to a User Equipment (UE) attached to a femtocell by extending the capability of the femtocell with the Packet Data Network (PDN) gateway function in a wireless communication system.

2. Description of the Related Art

A femtocell is a small cellular base station designed to provide short-range coverage of about 10 meters for use in a home or small business and with a broadband connection to the core network. The femtocell extends the cellular network coverage by providing a user with higher quality and fixed-mobile convergence services indoors.

The $3^{rd}$ Generation Partnership Project (3GPP) Long Term Evolution (LTE) system includes an evolved Node B (eNB) and home eNB (HeNB). The eNB represents a macro base station, and the HeNB represents a femto base station.

The 3GPP LTE supports the deployment of femto base stations with legacy macro base stations. The femto base station can be installed by a carrier or a user to extend coverage and capacity or for specific service provision. Typically, the femtocell provides a service coverage area of a few meters up to the size of the macrocell.

In a conventional wireless communication system, a UE connected to a femto base station accesses a PDN via a serving gateway and a PDN gateway, even though the femto base station can connect to the PDN directly.

Accordingly, there is a new requirement of the local IP access service to provide direct communication with a local IP network without engaging a carrier network. In order to meet this requirement, integrating PDN gateway functionalities into the femto base station has been proposed.

However, in the this proposed system architecture, where the femto base station integrates functionalities of the femto base station gateway and the local gateway (PDN gateway and/or serving gateway), when the internal serving gateway and PDN gateway of the femto base station exchange control messages with a Mobility Management Entity (MME), the control message exchange between the macro serving gateway and macro PDN gateway and the MME is impossible for a number of reasons.

First, because there can be such a large number of femto base stations, i.e., a few thousand or ten thousands times more than that of the macro serving gateways, it is ineffective and actually impossible to acquire the access information by registering the information of the local serving gateway and local PDN gateway of the femto base station along with the information of the macro serving gateway and then later search for corresponding registration information.

Second, when using a femto base station gateway for managing a larger number of femto base stations, because the femto base station gateway operate such that all the femto base stations under the management of the femto base station gateway are shown as a single femto base station in view of the MME, the MME cannot discriminate among the femto base stations.

Third, because the control messages exchanged between the serving gateway and MME use International Mobile Subscriber Identity (IMSI) for identifying the per-UE information, but the control messages exchanged between the base station and MME use Serving Temporary Mobile Subscriber Identity (S-TMSI) for identifying the per-UE information, the local serving gateway or local PDN gateway in the base station cannot identify the base station serving the UE, when only receiving the IMSI included in the message transmitted by the MME.

SUMMARY OF THE INVENTION

In order to address at least the above-described problems of the prior art, the present invention provides a method and apparatus for supporting local IP access of a UE connected to a femto base station in a wireless communication system.

In the wireless communication system configured to support the local IP access, the wireless communication system including the femto base station having the PDN gateway functionality, the data path from the UE to the local IP access network is determined depending on the location of the serving base station. When the UE enters an idle mode while the data path of a UE-femto base station-local PDN gateway of a femto base station is established, the UE cannot receive data before its operation mode is switched to an active mode because there is no serving gateway for buffering the data destined for the UE operating in the idle mode and notifying the MME of the data destined for the UE so as to trigger the UE to transition to the active mode, on the data path.

When the UE enters the idle mode while the data path of a UE-femto base station-local PDN gateway of femto base station is established, the femto base station is required to notify the MME of the data destined for the UE while buffering the data. However, because there is no serving gateway for controlling the MME to transmit a paging signal that indicates that the UE is to transition to the active mode, the UE cannot receive the data until the UE switches to the active mode by itself.

Additionally, there is a need to improve the data path efficiency of a UE-femto base station-local PDN gateway of a femto base station and the control path of a UE-femto base station-MME-serving gateway-local PDN gateway of a femto base station by enabling transmission of a General Packet Radio Service (GPRS) Tunnelling Protocol (GTP) control message to the local PDN gateway using the control connection between the femto base station and the MME.

In accordance with an embodiment of the present invention, a method for supporting local Internet Protocol (IP) access of a femtocell in a wireless communication system includes receiving a service request from a User Equipment (UE), transmitting an initial UE message including information on a local gateway to a Mobility Management Entity (MME), storing bearer information carried in an initial context setup request transmitted by the MME, receiving a Packet Data Network (PDN) connectivity request from the UE, forwarding the PDN connectivity request to the MME, receiving a create session request from the MME, and establishing a radio bearer with the local gateway, the local gateway being co-located with the femtocell.

In accordance with another embodiment of the present invention, an apparatus for supporting local Internet Protocol (IP) access in a wireless communication system includes a femtocell that receives a service request from a User Equipment (UE), transmits, an initial UE message including information on a local gateway to a Mobility Management Entity (MME), stores bearer information carried in an initial context setup request transmitted by the MME, receives a Packet Data Network (PDN) connectivity request from the UE, and forwards the PDN connectivity request to the MME; a local serving gateway that receives a create session request from the MME, and establishes a radio bearer; and a local PDN gateway that is connected to a PDN with a core network and establishes the radio bearer with the serving gateway.

In accordance with another embodiment of the present invention, a data path configuration method in a wireless communication system including a femto base station includes establishing, when a User Equipment (UE) is in active state, a first data path connecting the UE, the femto base station, and a local Packet Data Network (PDN) gateway co-located with the femto base station, the local PDN gateway supporting a local Internet Protocol (IP) access function; and establishing a second data path connecting the UE, the femto base station, a serving gateway, and the local PDN gateway, when the UE transitions from the active state to an idle state.

BRIEF DESCRIPTION OF THE DRAWINGS

The above and other aspects, features, and advantages of the present invention will be more apparent from the following detailed description when read in conjunction with the accompanying drawings, in which.

DETAILED DESCRIPTION OF EMBODIMENTS OF THE INVENTION

Various embodiments of the present invention are described in detail herein below with reference to the accompanying drawings. The same reference numbers are used throughout the drawings to refer to the same or like parts. The described features and advantages of the invention may be combined in any suitable manner in one or more embodiments and one skilled in the art would recognize that the invention may be practiced without one or more of the specific features or advantages of a particular embodiment. Detailed descriptions of well-known functions and structures incorporated herein may be omitted to avoid obscuring the subject matter of the present invention.

Additionally, although the present invention is described below with reference to the 3GPP LTE standard, the present invention is not limited to 3GPP LTE systems.

In the following description, a Local IP Access (LIPA) service is a service in which data of a UE is directly transferred to a local network (i.e., a local IP access network) without passing the core network.

In the following description, the local IP access network can be any type of network (e.g., an Internet and home network for home network service) heterogeneous with a core network.

Figure 1:
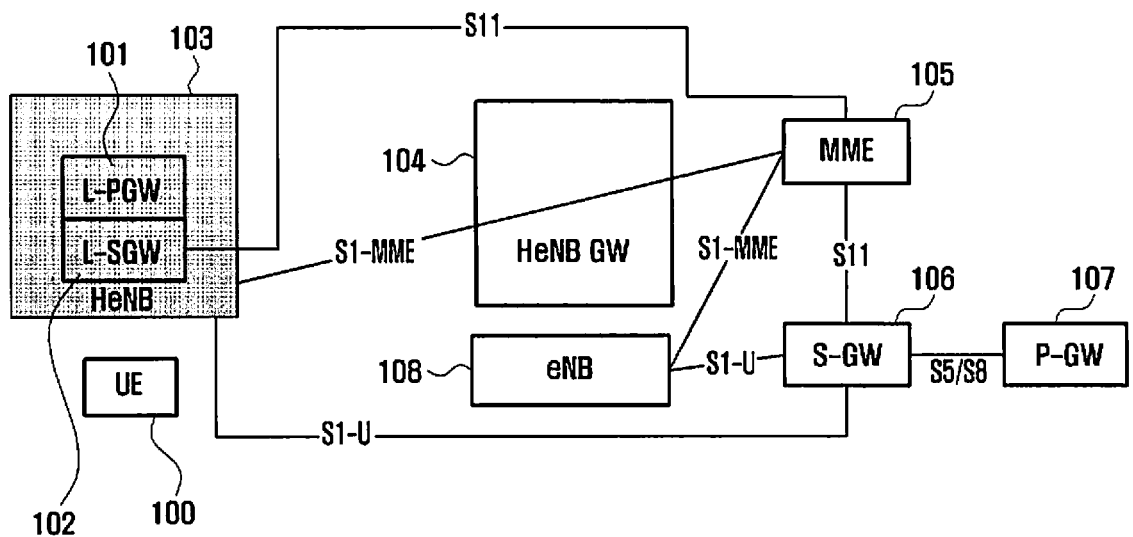
FIG. 1 is a diagram illustrating a network architecture of a wireless communication system according to an embodiment of the present invention.

FIG. 1 is a schematic diagram illustrating an architecture of a wireless communication system according to an embodiment of the present invention.

Referring to FIG. 1, the wireless communication system includes a UE 100, a femto base station 103 including a Local PDN GateWay (L-PGW) 101 and a Local Serving GateWay (L-SGW) 102, a macro base station (or eNB) 108, a femto base station gateway (or HeNB GW) 104, an MME 105, a macro serving gateway (S-GW) 106, and a PDN gateway (P-GW) 107. The S-GW 106 and P-GW 107 are included in a core network.

The UE 100 can access the core network via the eNB 108 or the HeNB 103.

The L-PGW 101 is a local PDN gateway implemented in the HeNB 103, and the L-SGW 102 is the local serving gateway implemented in the HeNB 103.

The HeNB 103 is connected to the core network through the MME 105 to provide the UE 101 with a mobile communication service. The HeNB 103 can be referred to as Closed Subscriber Group (CSG) cell, which permits access of a specific group of UEs. The CSG cell can be a home cell installed in a small area, e.g., within a home, or a business/local network cell for covering relatively large area. In accordance with an embodiment of the present invention, the HeNB 103 permits the access of the registered UEs for the mobile communication service and broadcasts a CSG-ID in a System Information Block (SIB) message.

The HeNB GW 104 connects the HeNB 103 to the MME 105.

The MME 105 manages the UEs in idle mode and selecting the S-GW 106 and P-GW 107. Also, the MME 105 is responsible for functions related to the roaming and authentication. Further, the MME 105 processes bearer signaling generated by the UE 100.

The S-GW 106 acts as a mobility anchor in a handover of the UE 100 between base stations (including eNB 108 and HeNB 103) or between 3GPP radio access networks.

The P-GW 107 allocates an IP address to the UE 100, performs packet data-related functions of the core network, and acts as an anchor for the mobility between 3GPP radio access network and non-3GPP radio access network. The P-GW 107 is also responsible for the bearer bandwidth determination and forwarding and routing functions.

The eNB 108 is a base station responsible for the macrocell. The eNB 108 establishes a radio channel with the UE 100 and manages radio resources. For example, the eNB 108 broadcasts system information including the control information required in the macro cell and allocates radio resources for communications with the UE 100. The eNB 108 also can determine handover based on a measurement report fed back by the UE 100 and send a handover command to the UE 100. The eNB 108 includes a control protocol such as Radio Resource Protocol (RRP) for radio resource management.

Figure 2:
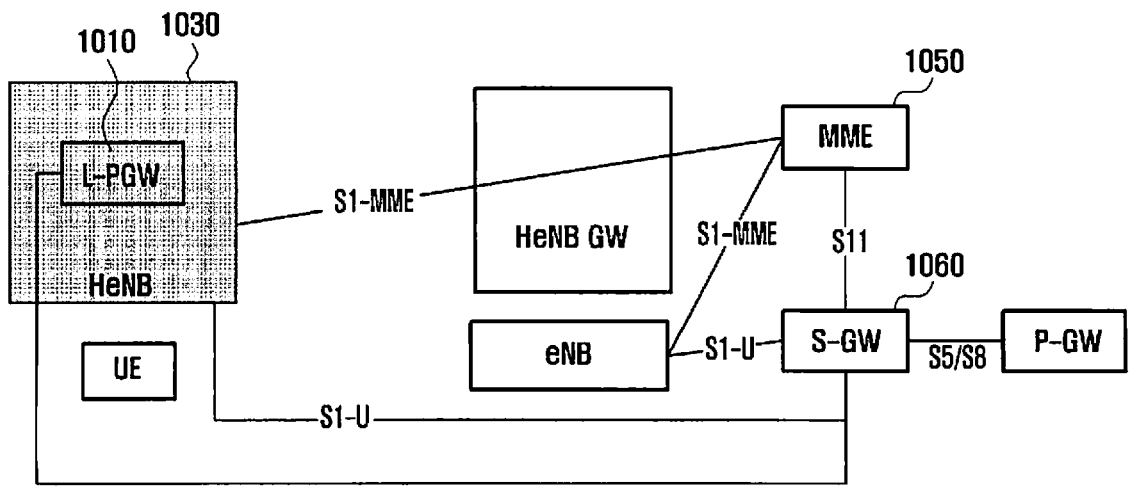
FIG. 2 is a diagram illustrating a network architecture of a wireless communication system according to another embodiment of the present invention.
Figure 7:
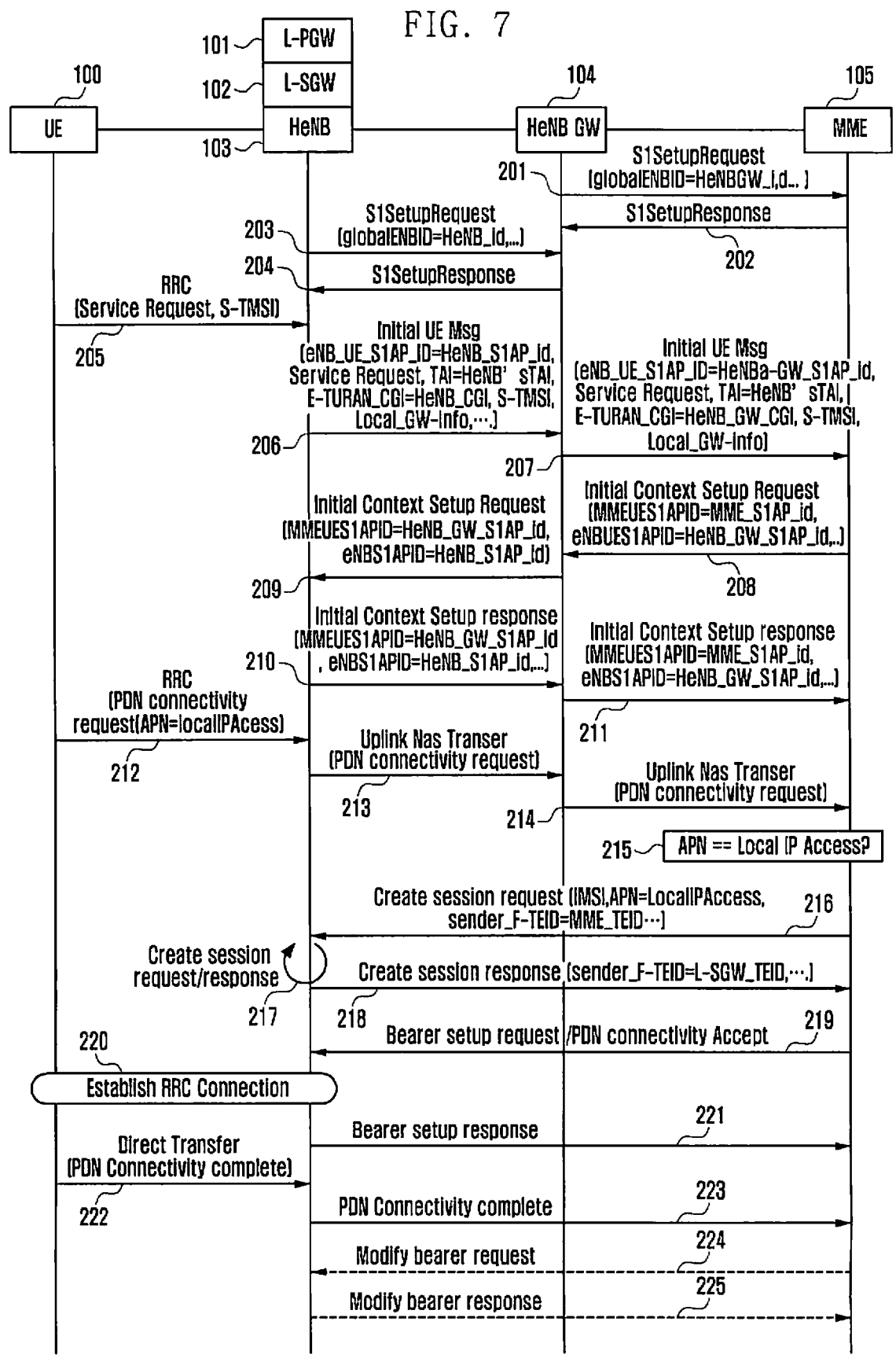
FIG. 7 is a signaling diagram illustrating operations of the network entities for supporting local IP access service in systems as illustrated in FIGS. 1 and 2.

FIGS. 1 and 2 are diagrams illustrating network architectures of wireless communication systems according to embodiments of the present invention, and FIG. 7 is a signaling diagram illustrating operations of network entities for supporting local IP access in systems as illustrated in FIGS. 1 and 2.

Referring to FIGS. 1 and 7, the HeNB 103 or the HeNB GW 104 is allocated an IP address according to a Dynamic Host Configuration Protocol (DHCP) or static configuration and establishes a connection with the MME 105. More specifically, the HeNB GW 104 transmits an S1 SETUP REQUEST message including its own Identification (ID) to the MME 105 in step 201 and receives an S1 SETUP RESPONSE message from the MME 105 in step 202. In step 203, the HeNB 103 transmits an S1 SETUP REQUEST message including its ID to the HeNB GW 104 and receives an S1 SETUP RESPONSE message from the HeNB GW 104 in step 204.

After the connection between the HeNB 103 and the HeNB GW 104 and the connection between the HeNB GW 104 and the MME 105, the UE 100 transmits a SERVICE REQUEST message toward the MME 105 via the HeNB 103 in step 205. To deliver the UE's message to MME 105, the HeNB 103 transmits an INITIAL UE message including the SERVICE REQUEST message of the UE to the HeNB GW 104 in step 206. In addition to the UE's SERVICE REQUEST message, the INITIAL UE message may include local gateway information (Local GW-info) including the information for exchanging a control message such as IPv4 and/or IPv6 addresses and ports of the L-PGW 101 and L-SGW 103.

In step 207, the HeNB GW 104 stores the S-TMSI for use between the HeNB GW 104 and the MME 105 and the local GW-info that are carried in the INITIAL UE message and forwards the INITIAL UE message to the MME 105.

In step 208, the MME 105 transmits an INITIAL CONTEXT SETUP REQUEST message including the information on the establishment of a radio bearer for the UE to the HeNB GW 104. The HeNB GW 104 forwards the INITIAL CONTEXT SETUP REQUEST message to the HeNB 103 in step 209.

In step 210, the HeNB 103 stores the information related to the establishment of radio bearer for the UE 100 and transmits an INITIAL CONTEXT SETUP RESPONSE message toward the MME 105 via the HeNB GW 104. The HeNB GW 104 forwards the INITIAL CONTEXT SETUP RESPONSE message to the MME 105 in step 211.

After the radio bearer establishment information is transmitted to the HeNB 103, the UE 100 transmits a PDN CONNECTIVITY REQUEST message for local IP access to the HeNB 103 in step 212. The HeNB 103 forwards the PDN CONNECTIVITY REQUEST message to the HeNB GW 104 in step 213, and the HeNB GW 104 forwards the PDN CONNECTIVITY REQUEST message to the MME 105 in step 214.

In step 215, the MME 105 checks whether the request is for local IP access. If it is determined that the request is for local IP access, in step 216, the MME 105 transmits a CREATE SESSION REQUEST message directly to the L-SGW 102 using the local gateway information acquired from the INITIAL UE message.

Upon receipt of the CREATE SESSION REQUEST message, the L-SGW 102 establishes the requested radio bearer with the L-PGW 101, i.e. the bearer directly connecting the L-SGW 102 and the L-PGW 101, in step 217. In step 218, the L-SGW 102 transmits a CREATE SESSION RESPONSE message to the MME 105 for reporting the bearer establishment result.

In step 219, the MME 105 checks the bearer established between the L-SGW 102 and the L-PGW 101 by referencing the CREATE SESSION RESPONSE message and transmits a BEARER SETUP REQUEST message for setting up the radio bearer and a PDN CONNECTIVITY ACCEPT message for accepting the PDN connection toward the UE via the HeNB 103. Upon receipt of the BEARER SETUP REQUEST and PDN CONNECTIVITY ACCEPT message, the HeNB 103 establishes the radio bearer with the UE 100 in step 220 and forwards the PDN CONNECTIVITY ACCEPT message to the UE 100.

After the establishment of the radio bearer, the HeNB 103 transmits a BEARER SETUP RESPONSE message to the MME 105 in step 221, and the UE 100 transmits a PDN CONNECTIVITY COMPLETE message to the HeNB 103 in step 222. The HeNB 103 forwards the PDN CONNECTIVITY COMPLETE message to the MME 105 in step 223.

Upon receipt of the PDN CONNECTIVITY COMPLETE message, the MME 105 determines whether the update of the information related to the radio bearer is required in the L-SGW 102 or L-PGW 101. If it is determine that radio bearer information update is required in the L-SGW 102 or L-PGW 101, the MME 105 transmits a MODIFY BEARER REQUEST message including the update bearer information to the L-SGW 102 in the HeNB 103 in step 224. In response to the MODIFY BEARER REQUEST message, the L-SGW 102 transmits a MODIFY BEARER RESPONSE message to the MME 105 in step 225. If the MODIFY BEARER REQUEST message is received, the MME ends the local PDN connection establishment procedure.

Additionally, the local GW-info transmitted in the INITIAL UE message in step 203 can be carried by the INITIAL CONTEXT SETUP RESPONSE message in step 210.

The method of FIG. 7 can also be applied to a system as illustrated in FIG. 2 in which only the L-PGW 1010 is included in the HeNB 1030 with the involvement of the S-GW 1060. Using the system architecture of FIG. 2, the messages transmitted from the MME 105 to the L-SGW 102 and the L-PGW 101 in the embodiment illustrated in FIG. 1 are instead transmitted from the MME 1050 to the L-PGW 1010 via the SGW 1060.

Figure 3:
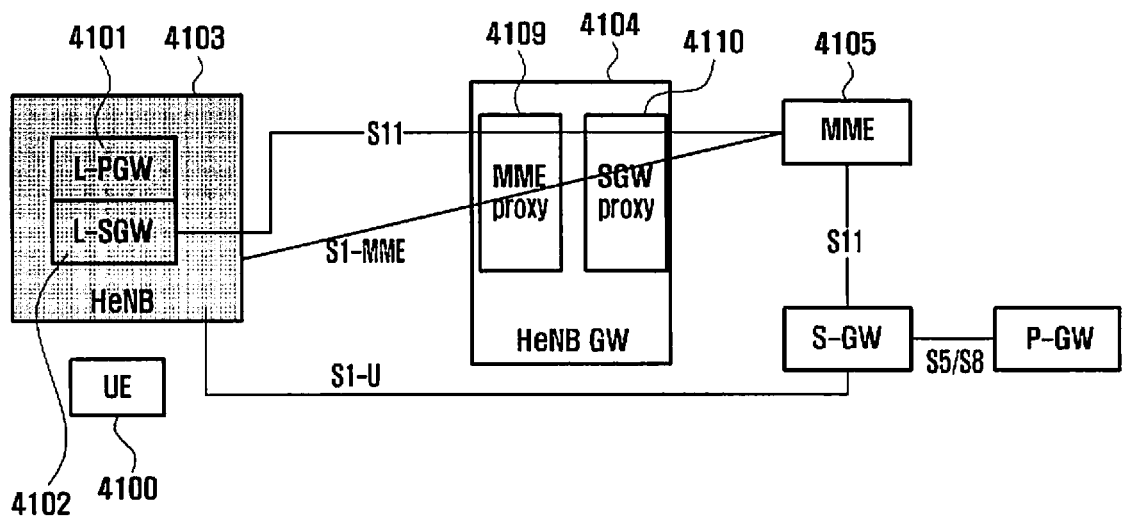
FIG. 3 is a diagram illustrating a network architecture of a wireless communication system according to another embodiment of the present invention.
Figure 4:
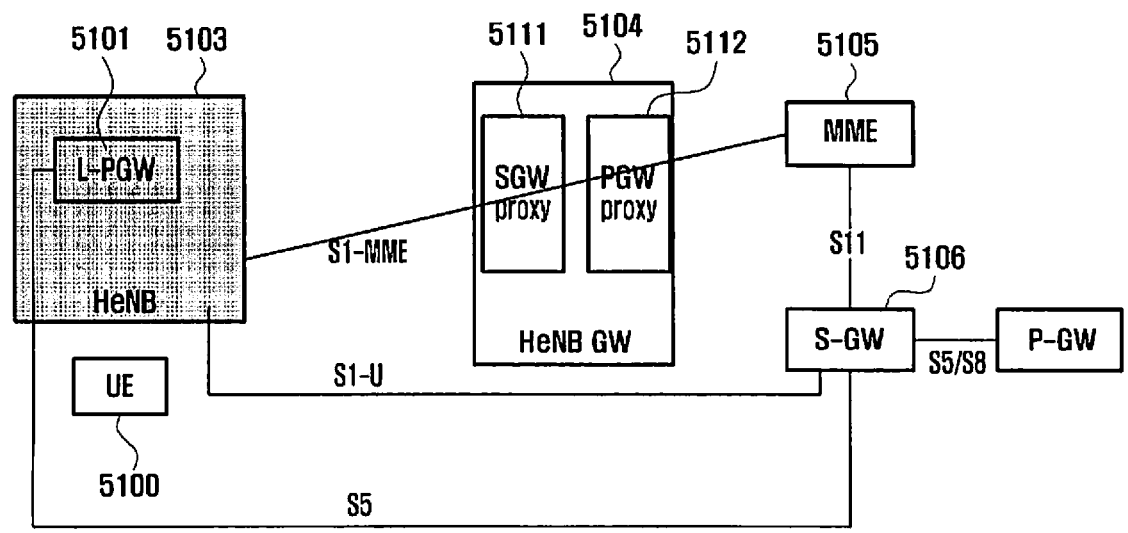
FIG. 4 is a diagram illustrating a network architecture of a wireless communication system according to another embodiment of the present invention.

FIGS. 3 and 4 are diagrams illustrating network architectures of wireless communication systems according to embodiments of the present invention, and FIGS. 8 to 11 are signaling diagrams illustrating operations of network entities for supporting local IP access in systems as illustrated in FIGS. 3 and 4.

Figure 8:
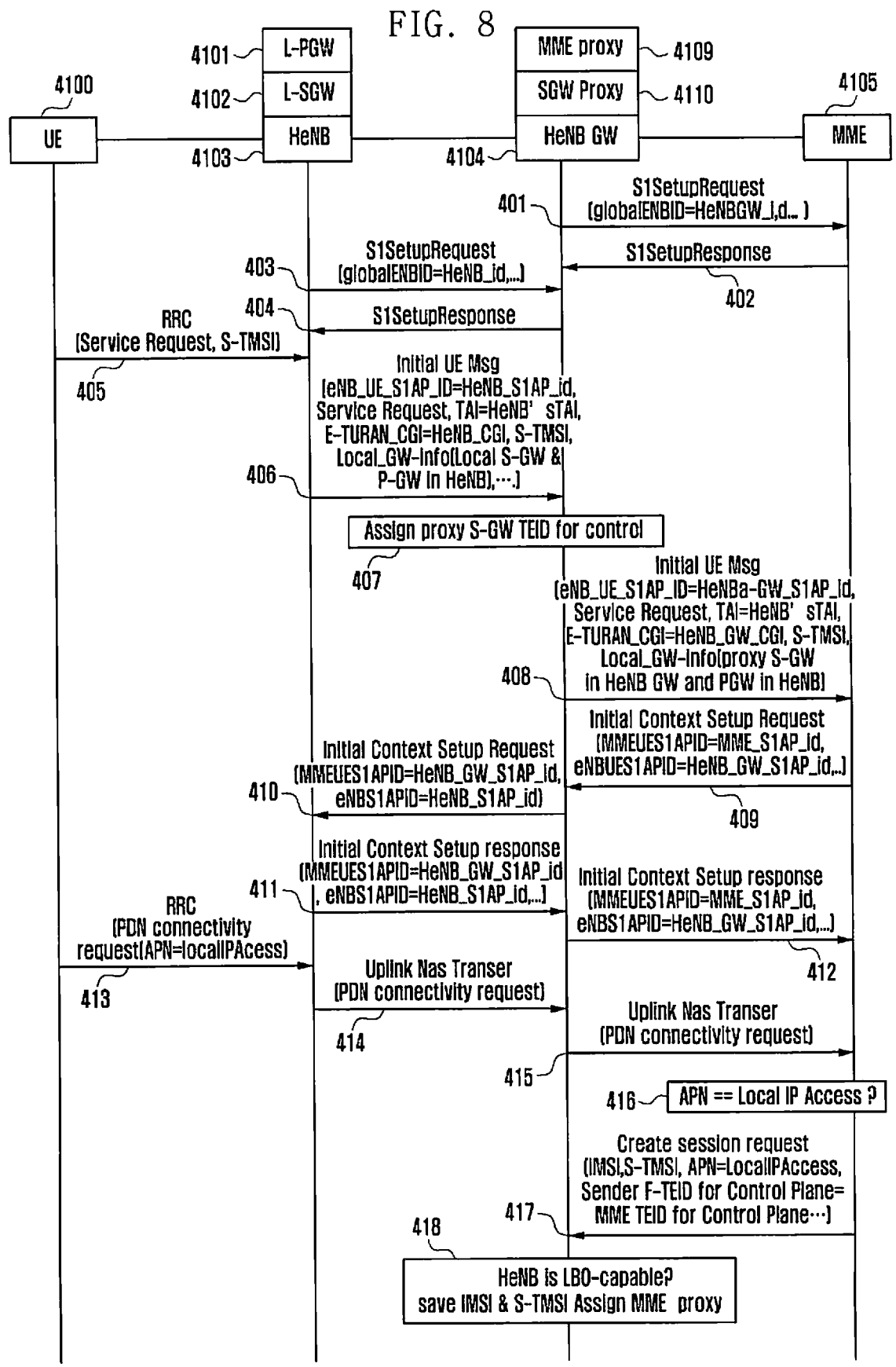
FIGS. 8 and 9 are a signaling diagram illustrating operations of the network entities for configuring a PDN connection to provide the local IP access service in a wireless communication system as illustrated in FIG. 3.

Referring to FIGS. 3 and 8, the HeNB 4103 or the HeNB GW 4104 is allocated an IP address according to a DHCP or static configuration and establishes a connection with the MME 4105. More specifically, the HeNB GW 4104 transmits an S1 SETUP REQUEST message including its ID to the MME 4105 in step 401. In step 402, the MME 4105 transmits an S1 SETUP RESPONSE message to the HeNB GW 4104.

In step 403, the HeNB 4103 also transmits an S1 SETUP REQUEST message including its ID to the HeNB GW 4104. Upon receipt of the S1 SETUP REQUEST message, the HeNB GW 4104 transmits an S1 SETUP RESPONSE message to the HeNB 4103 in step 404, thereby establishing a connection between the HeNB 4103 and the HeNB GW 4104.

After the establishment of the connections between the HeNB 4103 and the HeNB GW 4104 and between the HeNB GW 4104 and the MME 4105, the UE transmits a SERVICE REQUEST message to the HeNB 4103 in step 405. In step 406, the HeNB 4103 transmits an INITIAL UE message indicating the receipt of the SERVICE REQUEST message from the UE to the HeNB GW 4104. The INITIAL UE message carries the local gateway information (Local GW-info) including the information required for the control message exchange such as IPv4 and/or IPv6 addresses and ports of the L-PGW 4101 and the L-SGW 4102.

The HeNB GW 4104 stores the S-TMSI as the UE ID for use between the MME 4105 and the HeNB 4103 and the Local GW-info that is carried by the INITIAL UE message and assigns an SGW proxy for processing the information transmitted from the MME 4105 to the L-SGW 4102 in step 407. In step 408, the HeNB GW 4104 forwards the INITIAL UE message to the MME 405.

Upon receipt of the INITIAL UE message, the MME 4105 transmits an INITIAL CONTEXT SETUP REQUEST message including the information related to the establishment of a radio bearer for the UE to the HeNB GW 4104 in step 409. The HeNB GW 4104 forwards the INITIAL CONTEXT SETUP REQUEST message to the HeNB 4103 in step 410.

Upon receipt of the INITIAL CONTEXT SETUP REQUEST message, the HeNB 4103 stores the information related to the establishment of the radio bearer for the UE 4100 and transmits an INITIAL CONTEXT SETUP RESPONSE message to the HeNB GW 4104 in step 411. The HeNB GW 4104 forwards the INITIAL CONTEXT SETUP RESPONSE to the MME 4105 in step 412.

In step 413, after the HeNB 4103 has acquired the information related to the establishment of the radio bearer for the UE, the UE 4100 transmits a PDN CONNECTIVITY REQUEST message to the HeNB 4103. The PDN CONNECTIVITY REQUEST message is transmitted to request the PDN connection establishment for local IP access. The HeNB 4103 forwards the PDN CONNECTIVITY REQUEST message to the MME 4105 via the HeNB GW 4104 in steps 414 and 415.

Upon receipt of the PDN CONNECTIVITY REQUEST message, the MME 4105 determines if the PDN CONNECTIVITY REQUEST message is transmitted for the purpose of the local IP access in step 416.

When it is determined that the PDN CONNECTIVITY REQUEST message is transmitted for the purpose of the local IP access, the MME 4105 transmits a CREATE SESSION REQUEST message including the local gateway information, which is acquired from the INITIAL UE message in step 408, to the HeNB GW 4104 in step 417. The CREATE SESSION REQUEST message can include a same IMSI as the UE ID for use between the serving gateway and the MME 4104, a same S-TMSI as the UE ID for use between the HeNB and MME 4105, and L-PGW information acquired from the INITIAL UE message in step 408.

The CREATE SESSION REQUEST message also can include the information on the L-SGW 4102 acquired from the INITIAL UE message in step 408. The information on the L-SGW 4102 can include the information on the SGW proxy 4110 that is assigned by the HeNB GW 4104, such that the CREATE SESSION REQUEST message is transferred to the SGW proxy 4110 in the HeNB GW 4104.

Upon receipt of the CREATE SESSION REQUEST message, the HeNB GW 4104 saves the IMSI and S-TMSI extracted from the CREATE SESSION REQUEST message and assigns an MME proxy 4109 in step 418. Thereafter, the HeNB GW 4104 searches for the L-SGW to receive the CREATE SESSION REQUEST message with reference to the S-TMSI and Local GW-info acquired from the INITIAL UE message in step 406.

Figure 9:
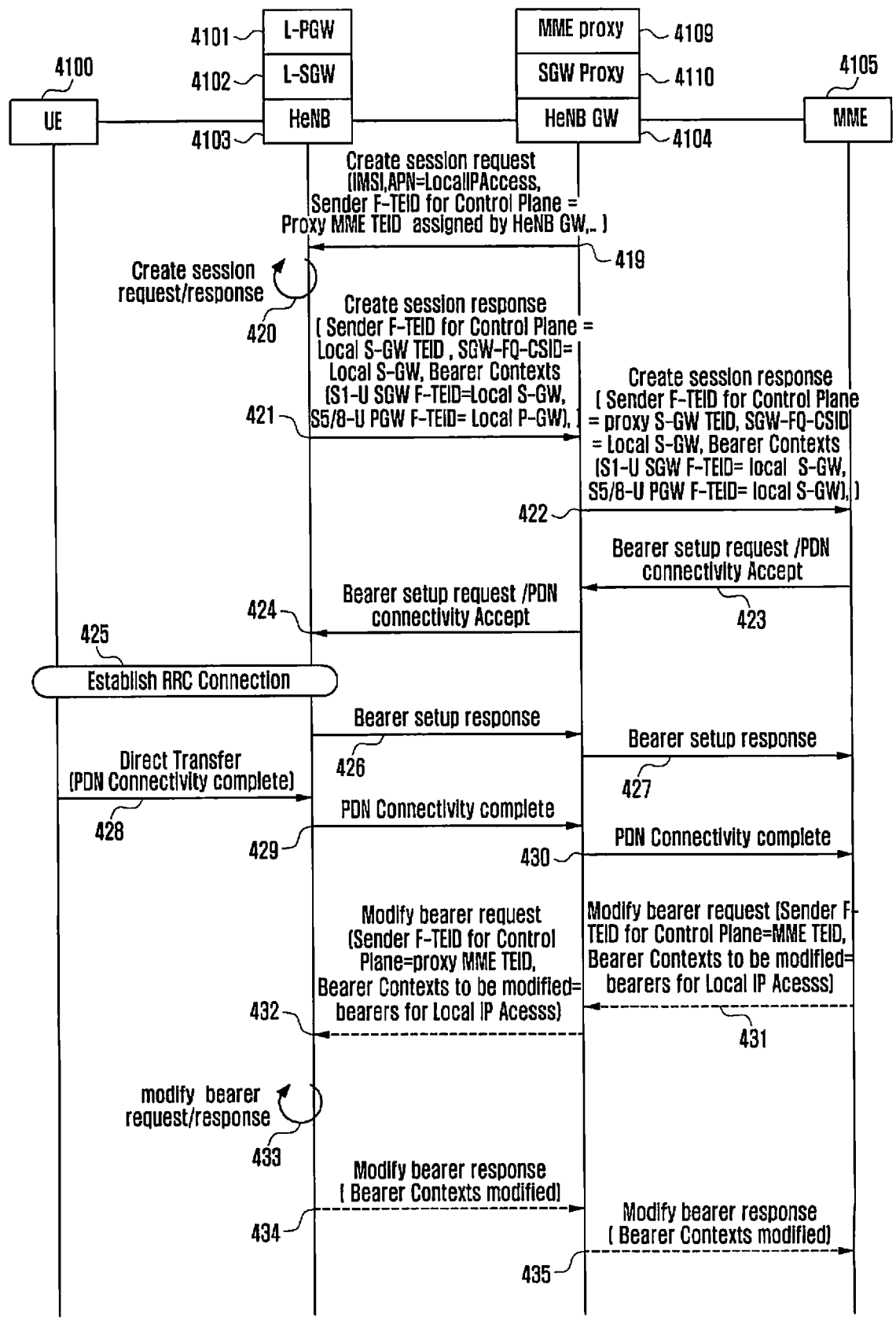

Referring to FIGS. 3 and 9, the HeNB GW 4104 forwards the CREATE SESSION REQUEST message to the found L-SGW 4102 in the HeNB 4103 in step 419. Before forwarding the CREATE SESSION REQUEST message, the HeNB GW 4104 assigns the MME proxy 4109, such that the control messages destined to the MME 4105 are relayed via the MME proxy 4109. The CREATE SESSION REQUEST message includes the information on the address and port of the MME proxy 4109 and Sender Full-Tunnel Endpoint Identifier (F-TEID) for Control Plane which is equal to Proxy MME TEID assigned by the HeNB GW 4104.

Upon receipt of the CREATE SESSION REQUEST message, the L-SGW 4102 requests the L-PGW 4101 to create a session between the L-SGW 4102 and the L-PGW 4101 in step 420. In step 421, the L-SGW 4102 transmits a CREATE SESSION RESPONSE message to the MME proxy 4109 in the HeNB GW 4104. The HeNB GW 4104 resets the Sender F-TEID included in the CREATE SESSION RESPONSE message to the ID of the SGW proxy 4110 and forwards the CREATE SESSION RESPONSE message to the MME 4105 in step 422.

In step 423, the MME 4105 transmits a BEARER SETUP REQUEST message for requesting radio bearer establishment from the HeNB GW 4104 along with the PDN CONNECTIVITY ACCEPT message indicating that the PDN connection is accepted. Upon receipt of the BEARER SETUP REQUEST and PDN CONNECTIVITY ACCEPT messages, the HeNB GW 4104 forwards the BEARER SETUP REQUEST and PDN CONNECTIVITY ACCEPT messages to the HeNB 4103 in step 424. In step 425, the HeNB 4103 establishes a radio bearer (RRC connection) with the UE 4100.

After the establishment of the RRC connection between the UE 4100 and the HeNB 4103, the HeNB 4103 transmits a BEARER SETUP RESPONSE message indicating the RRC connection establishment to the HeNB GW 4104 in step 426. The HeNB GW 4104 forwards the BEARER SETUP RESPONSE message to the MME 4105 in step 427.

After the BEARER SETUP RESPONSE message is transmitted from the HeNB 4103 to the MME 4105, the UE 4100 transmits a PDN CONNECTIVITY COMPLETE message indicating the completion of the PDN connection establishment for local IP access to the HeNB 4103 in step 428. The HeNB 4103 forwards the PDN CONNECTIVITY COMPLETE message to the HeNB GW 4104 in step 429, and the HeNB GW 4104 forwards the PDN CONNECTIVITY COMPLETE message to the MME 4105 in step 430.

When the information related to the radio bearer is to be updated, the MME 4105 transmits a MODIFY BEARER REQUEST message to the L-SGW 4102 via the SGW proxy 4110 in steps 431 and 432. In step 433, the L-SGW 4102 updates the radio bearer-related information with the L-PGW 4101 in the HeNB 4103. Thereafter, in steps 434 and 435, the L-SGW 4102 transmits a MODIFY BEARER RESPONSE message to the MME 4105 via the MME proxy 4109, thereby completing the local PDN connection establishment.

In the above-described procedure, the local GW-info is carried by the S1 SETUP REQUEST message in step 403 and the INITIAL CONTEXT SETUP REQUEST message in step 410. When there is no need to update the corresponding information in the L-SGW 4102 and the L-PGW 4101, after the establishment of the radio bearer, steps 431 to 435 are then not performed.

The procedure described with reference to FIGS. 3, 8, and 9 can also be applied in network architecture as illustrated in FIG. 4, which includes an L-PGW 5105 implemented in an HeNB 5103 and uses a macro SGW 5106. In this case, the data path can be established according to a procedure as illustrated in FIGS. 10 and 11.

Figure 10:
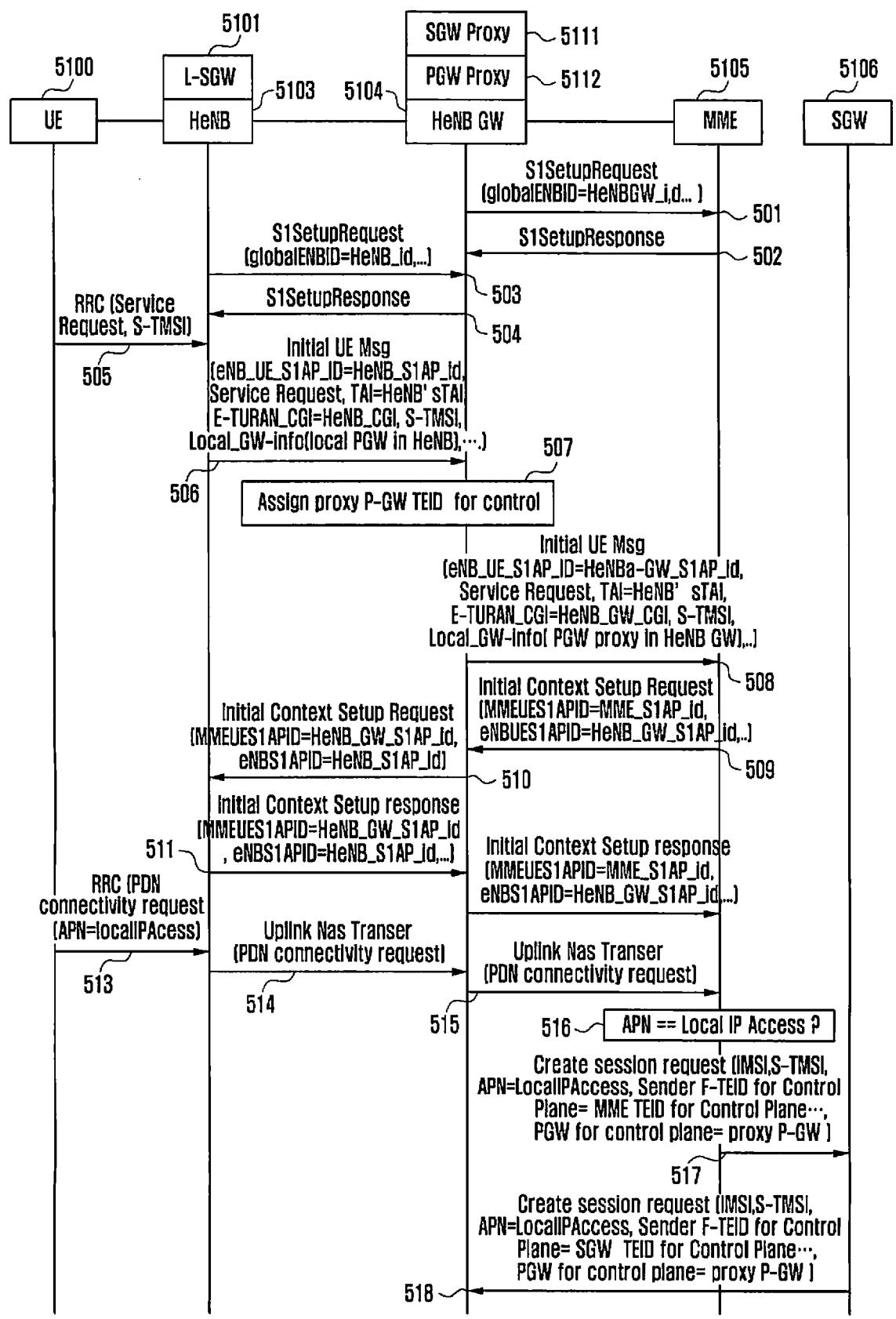
FIGS. 10 and 11 are a signaling diagram illustrating operations of the network entities for configuring a PDN connection to provide local IP access service in a wireless communication system as illustrated in FIG. 4.
Figure 11:
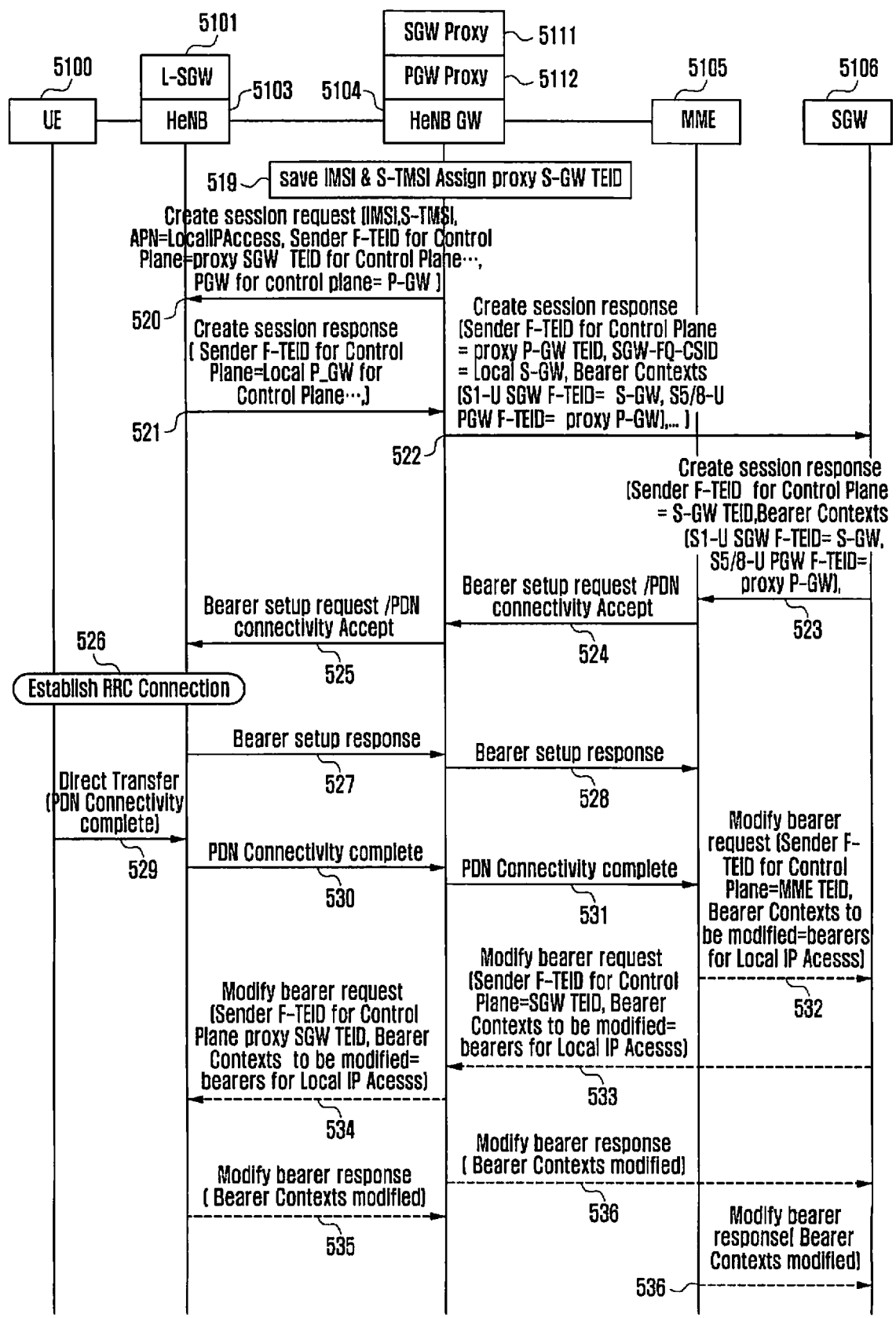

The data path establishment procedure illustrated in FIGS. 10 and 11 for a network architecture as illustrated in FIG. 4 differs from that illustrated in FIGS. 8 and 9 for a network architecture as illustrated in FIG. 3 in that a PGW proxy 5112 is assigned in the HeNB GW 5104 in step 507 of FIG. 10, unlike where the SGW proxy 4110 is assigned in the HeNB GW 4104 in step 407 of FIG. 8. Accordingly, the INITIAL UE message transmitted in step 508 of FIG. 10 carries only the access information of the PGW proxy 5112, unlike the INITIAL UE message transmitted in step 408. Also, the CREATE SESSION REQUEST message is transmitted from the MME 5105 to the PGW proxy 5112 via the macro SGW 5106 in step 517 of FIG. 10, unlike where the same message is transmitted from the MME 4105 to the SGW proxy 4110 in step 417 of FIG. 8. The CREATE SESSION REQUEST message transmitted by the macro SGW 5106 in step 518 includes the same IMSI and S-TMSI as the CREATE SESSION REQUEST message transmitted by the MME 5105 in step 517.

Unlike step 418 of FIG. 8, an SGW proxy 5111 is assigned in step 519 of FIG. 11, and the CREATE SESSION REQUEST message transmitted from the HeNB GW 5104 to the HeNB 5103 in step 520 includes the access information for the SGW proxy 5111. The CREATE SESSION RESPONSE message transmitted from the HeNB 5103 to the SGW 5106 via the HeNB GW 5104 in step 522 includes the Sender F-TEID reset for the PGW proxy 5112. Also, the CREATE SESSION RESPONSE message forwarded from the SGW 5106 to the MME 5105 in step 523 includes the Sender F-TEID reset for the macro SGW 5106. Additionally, the MODIFY BEARER REQUEST message is transmitted from the HeNB GW 5104 to the HeNB 5103, when update is required, for carrying the modified bearer information in step 534 toward the L-GW via the SGW proxy 5111.

Steps 509 to 516 of FIG. 10 are identical with steps 409 to 416 of FIG. 8, and steps 524 to 531 of FIG. 11 are identical with steps 423 to 430 of FIG. 9. Accordingly, a repetitive description will not be presented.

The Local GW-info can be carried by the S1 SETUP REQUEST message in step 503 and the INITIAL CONTEXT SETUP RESPONSE message in step 512.

When there is no need to update the corresponding information in the macro SGW 5106 and the L-PGW 5101, after the establishment of the radio bearer, steps 523 to 536 then are not performed.

Figure 5:
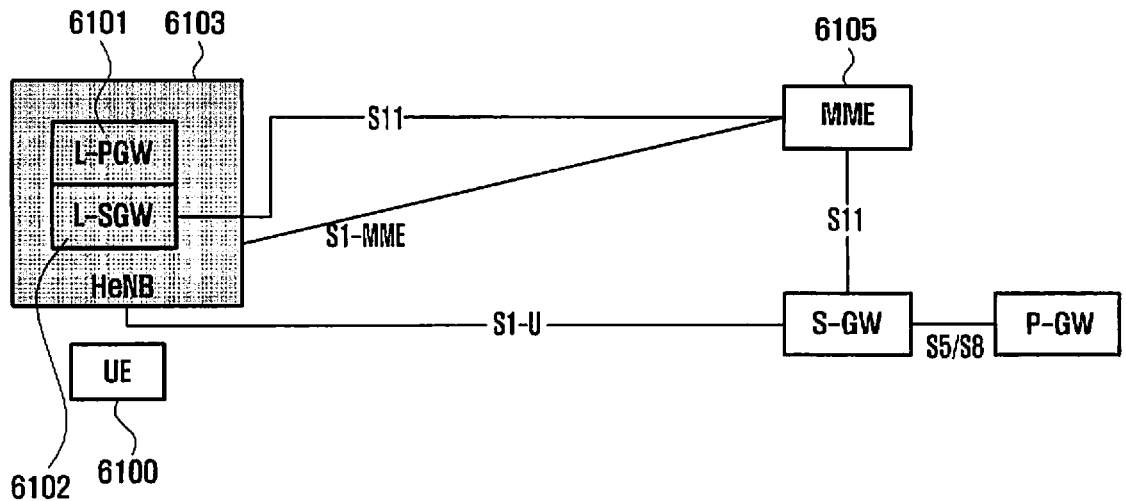
FIG. 5 is a diagram illustrating a network architecture of a wireless communication system according to another embodiment of the present invention.
Figure 6:
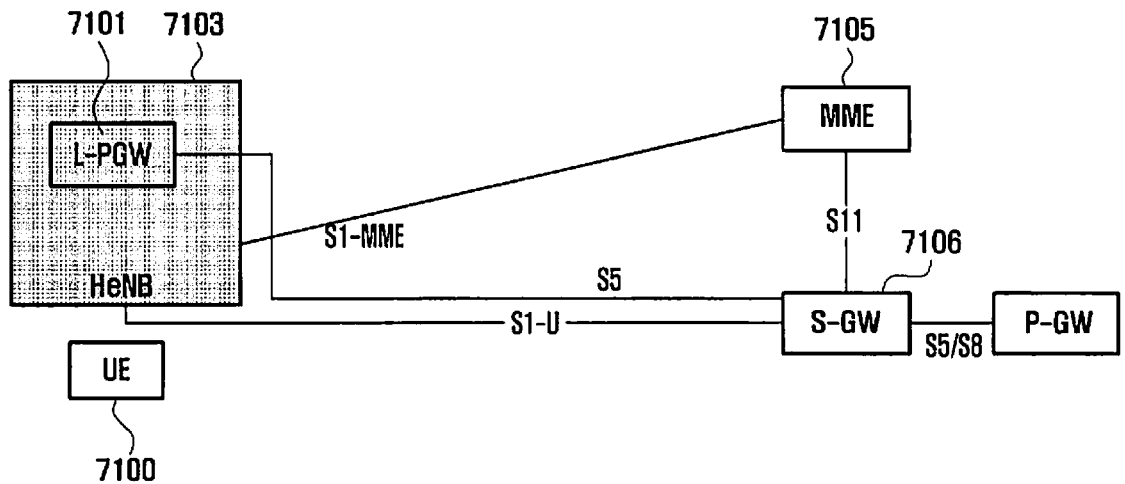
FIG. 6 is a diagram illustrating a network architecture of a wireless communication system according to another embodiment of the present invention.
Figure 12:
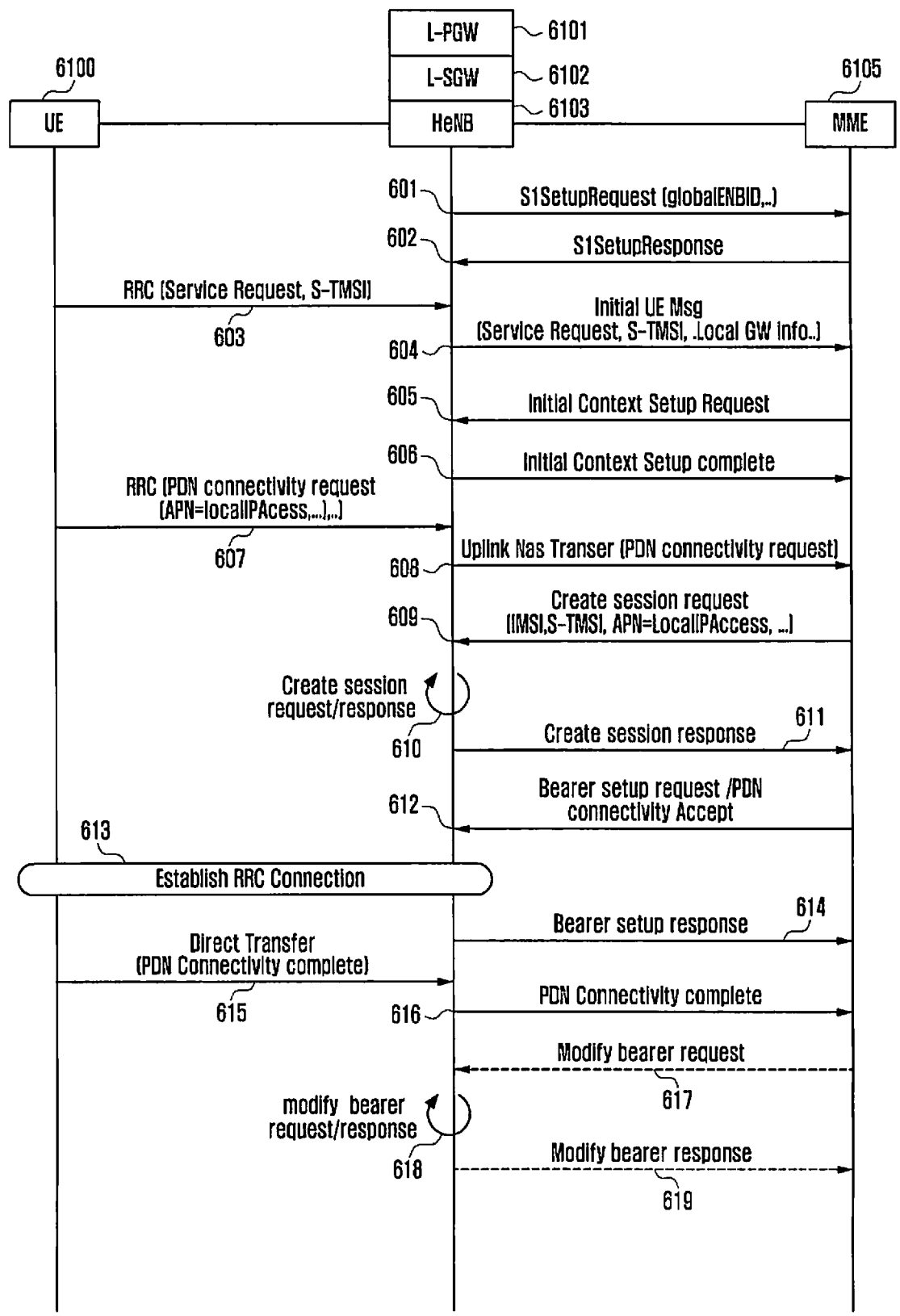
FIG. 12 is a signaling diagram illustrating operations of network entities for configuring a PDN connection to provide local IP access service in a wireless communication system as illustrated in FIG. 5.
Figure 13:
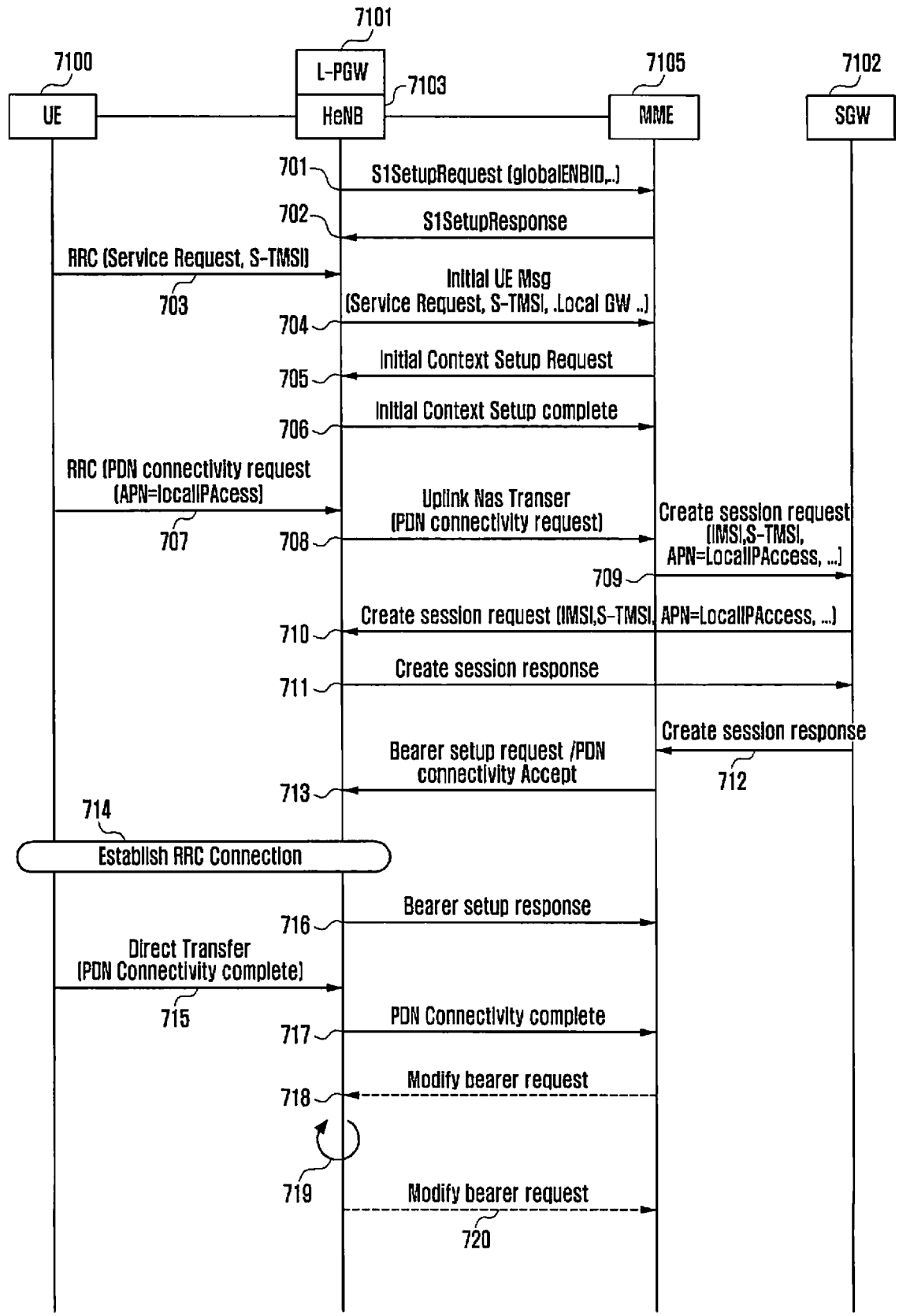
FIG. 13 is a signaling diagram illustrating operations of network entities for configuring a PDN connection to provide local IP access service in a wireless communication system as illustrated in FIG. 6.

FIGS. 5 and 6 are diagrams illustrating network architectures of wireless communication systems according to embodiments of the present invention, and FIGS. 12 and 13 are signaling diagrams illustrating operations of network entities for supporting local IP access in the systems illustrated in FIGS. 12 and 13.

Figure 28:
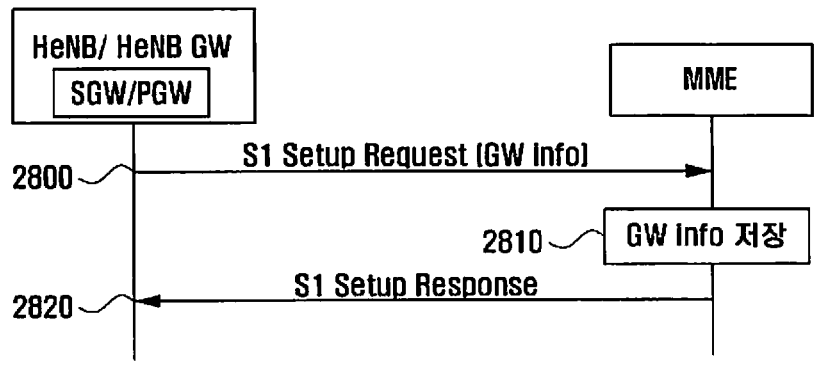
FIG. 28 is a signaling diagram illustrating operations of an HeNB/HeNB GW with extended functionality by incorporating an L-PGW and an L-SGW and an MME for managing information in a wireless communication system according to an embodiment of the present invention.

Referring to FIGS. 5, 6, 12, and 13, the HeNB 6103 is allocated an IP address according to the DHCP or static configuration and establishes a connection with the MME 6105. More specifically, the HeNB 6103 transmits an S1 SETUP REQUEST message to the MME 6105 in step 601. The S1 SETUP REQUEST message can include the collocated local SGW or local PGW information as seen in FIG. 28. In step 602, the MME 6105 transmits an S1 SETUP RESPONSE message to the HeNB 6103, thereby establishing a connection between the HeNB 6103 and the MME 6105.

After the connection establishment between the HeNB 6103 and the MME 6105, the UE 6100 transmits a SERVICE REQUEST message to the HeNB 6103 in step 603. In step 604, the HeNB 6103 transmits an INITIAL CONTEXT SETUP REQUEST message to the MME 6105. The INITIAL CONTEXT SETUP REQUEST message includes Local GW-info including the IPv4 and/or IPv6 addresses and ports of the L-PGW 6101 and the L-SGW 6102 and the SERVICE REQUEST message transmitted by the UE 6100.

Upon receipt of the INITIAL UE message, the MME 6105 saves the UE information including the S-TMSI as the UE ID for use between the HeNB 6103 and the MME 6105 and the Local GW-info that is carried by the INITIAL UE message and transmits an INITIAL CONTEXT SETUP REQUEST message to the HeNB 6103 in step 605. The INITIAL CONTEXT SETUP REQUEST message includes the information required for establishing radio bearer between the UE 6100 and the HeNB 6103. In response to the INITIAL CONTEXT SETUP REQUEST message, the HeNB 6103 transmits an INITIAL CONTEXT SETUP COMPLETE message to the MME 6105 in step 606.

After the completion of the initial context setup, the UE 6100 transmits a PDN CONNECTIVITY REQUEST message to the HeNB 6103 to establish a PDN connection for local IP access in step 607. The HeNB 6103 forwards the PDN CONNECTIVITY REQUEST message to the MME 6105 in step 608.

Upon receive the PDN CONNECTIVITY REQUEST message, the MME 6105 identifies that the PDN CONNECTIVITY REQUEST message is a PDN connection request for local IP access. When the PDN CONNECTIVITY REQUEST message is the PDN connection request for the local IP access, the MME 6105 transmits a CREATE SESSION REQUEST message including the IMSI as the UE ID for use in the original CREATE SESSION REQUEST message transmitted to the L-SGW 6102 and the S-TMSI as the UE ID for use between the HeNB 6103 and the MME 6105 to the HeNB 6103 in step 609. The MME 6105 refers to the local gateway information acquired from the INITIAL UE message in order to transfer the CREATE SESSION REQUEST message directly to the local SGW 6102.

Upon receipt of the CREATE SESSION REQUEST message, the L-SGW 6102 establishes a bearer indicated by the CREATE SESSION REQUEST message with the L-PGW 6101 in step 610. In step 611, the L-SGW 6102 transmits a CREATE SESSION RESPONSE message to the MME 6105 for informing of the bearer establishment result.

Upon receipt of the CREATE SESSION RESPONSE message, the MME 6105 identifies the bearer establishment and transmits a BEARER SETUP REQUEST message for establishing a radio bearer and a PDN CONNECTIVITY ACCEPT message informing acceptance of the PDN connection establishment to the HeNB 6103 in step 612.

If the BEARER SETUP REQUEST and PDN CONNECTIVITY ACCEPT messages are received, the HeNB 6103 establishes a radio bearer (RRC connection) with the UE 6100 in step 613. In step 614, the HeNB 6103 transmits a BEARER SETUP RESPONSE message including the RRC connection result to the MME 6105.

After the RRC connection establishment, the UE 6100 transmits a PDN CONNECTIVITY COMPLETE message to the HeNB 6103 in step 615. The HeNB 6103 forwards the PDN CONNECTIVITY COMPLETE message to the MME 6105 in step 616.

In step 617, the MME 6105 transmits a MODIFY BEARER REQUEST message for updating the radio bearer information to the L-SGW 6102. In step 618, the L-SGW 6102 requests the L-PGW 6101 to update the radio bearer information and receives a response. In step 619, the L-SGW 6102 transmits a MODIFY BEARER RESPONSE message to the MME 6105 in response to the MODIFY BEARER REQUEST message, thereby completing the local connection establishment procedure.

The Local GW-info transmitted in the INITIAL UE message in step 604 can be carried by the S1 SETUP REQUEST message in step 601 and the initial context setup complete message in step 606. The CREATE SESSION REQUEST message transmitted from the MME 6105 to the HeNB 6103 in step 609 can include the S-TMSI without the IMSI.

Additionally, the network can be configured as illustrated in FIG. 6, wherein the HeNB 7103 includes only the L-PGW 7101 and the macro serving gateway 7106 performs the function of the L-SGW 6102 of FIG. 5.

Using the network architecture of FIG. 6, as illustrated in FIG. 13, the MME 7105 transmits the CREATE SESSION REQUEST message to the SGW 7106 in step 709, and the SGW 7106 forwards the CREATE SESSION REQUEST message to the L-PGW 7101 of the HeNB 7103 in step 710. Both CREATE SESSION REQUEST messages include the S-TMSI.

Accordingly, the L-PGW 7101 transmits the CREATE SESSION RESPONSE message informing of the bearer establishment result to the macro SGW 7106 in step 711, and the macro SGW 7106 forwards the CREATE SESSION RESPONSE message to the MME 7105 in step 712.

Steps 701 to 709 of FIG. 13 are identical with steps 601 to 609 of FIG. 12, and steps 713 to 719 are identical with steps 612 to 618 of FIG. 12. Accordingly, a repetitive description will not be presented.

In FIG. 13, the CREATE SESSION REQUEST message transmitted from the SGW 7101 to the HeNB 7103 may the S-TMSI without the IMSI.

As described above, a UE connected to an HeNB can directly access a local IP Access service without passing through the carrier's network. Because the HeNB is responsible for the functions of the local gateway (local PGW with or without L-SGW), the UE connected to a HeNB can directly access the PDN without involvement of the core network, resulting in improvement of data transmission efficiency. Because the HeNB is responsible for gateway relay function, it is possible to use the security function as a local gateway and thus, improve the communication security between the HeNB and the MME of the core network.

Figure 14:
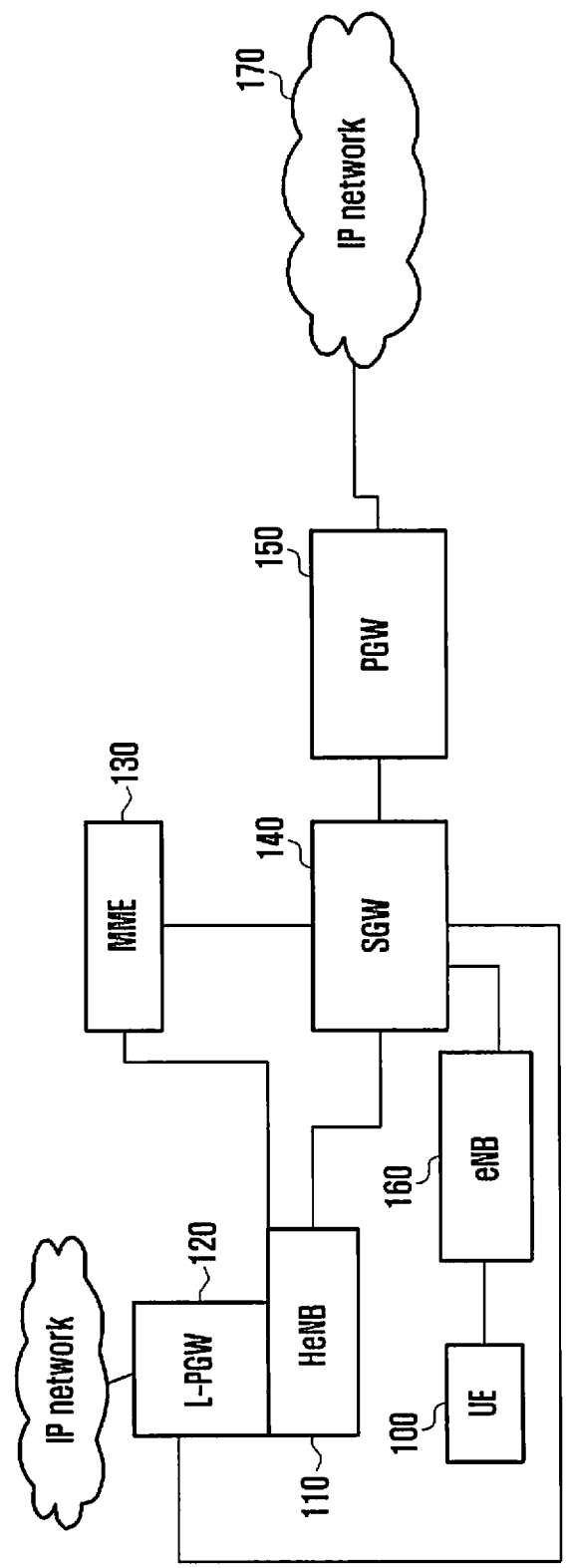
FIG. 14 is a diagram illustrating a network architecture of a wireless communication system including an HeNB according to an embodiment of the present invention.

FIG. 14 is a diagram illustrating a network architecture of a wireless communication system including an HeNB according to an embodiment of the present invention.

Referring to FIG. 14, the wireless communication system includes a UE 100, a femto base station (or HeNB) 110 having extended functionality with an L-PGW 120, an MME 130, an SGW 140, a PGW 150, a macro base station (or eNB) 160, and an IP network 170.

Figure 15:
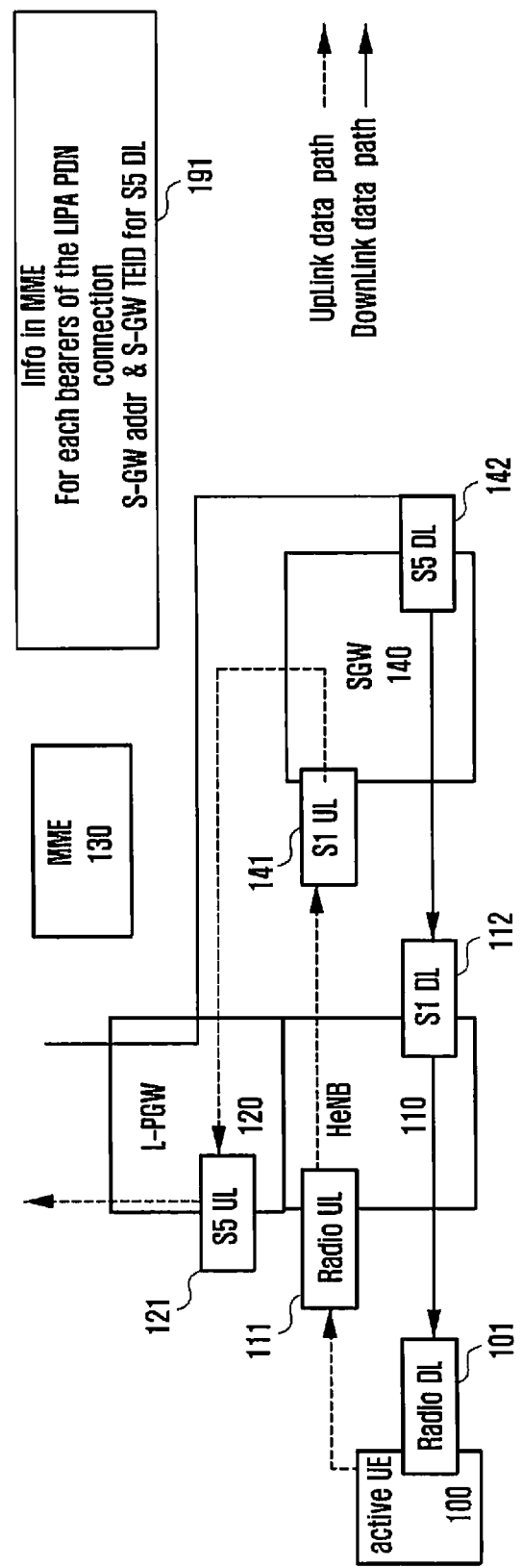
FIG. 15 is a diagram illustrating a data path established for a UE in an active mode to access an IP network in a system as illustrated in FIG. 14.

FIG. 15 is a diagram illustrating a data path established for a UE in an active mode to access an IP network in a system as illustrated in FIG. 14.

Referring to FIG. 15, the UpLink (UL) data transmitted from the UE 100 to the IP network 170 is delivered over the radio UL 111 between the UE and the HeNB 110, over the S1 UL 141 between the HeNB 110 and the SGW 140, over the S5 UL between the SGW 140 and the L-PGW 120, and an IP network interface between the L-PGW 120 and the IP network 170.

The DownLink (DL) data transmitted from the IP network 170 to the UE 100 is delivered over the reverse path. That is, the DL data transmitted from the IP network 170 to the UE 100 is delivered over the S5 DL 142 between the L-PGW 120 and the SGW 140, over the S1 DL 112 between the SGW 140 and the HeNB 110, and over the radio DL 101 between the HeNB 110 and the UE 100.

In order to process the UL and DL data, the MME 130 has the bearer information 191 about the S5 UL 121 of the L-PGW and the S1 UL 141 and the S5 DL 142 of the SGW 140 for the UE 100. Although the bearer information 191 lists only the S5 DL of the data plane in FIG. 15, it can also include other information mentioned above.

Figure 16:
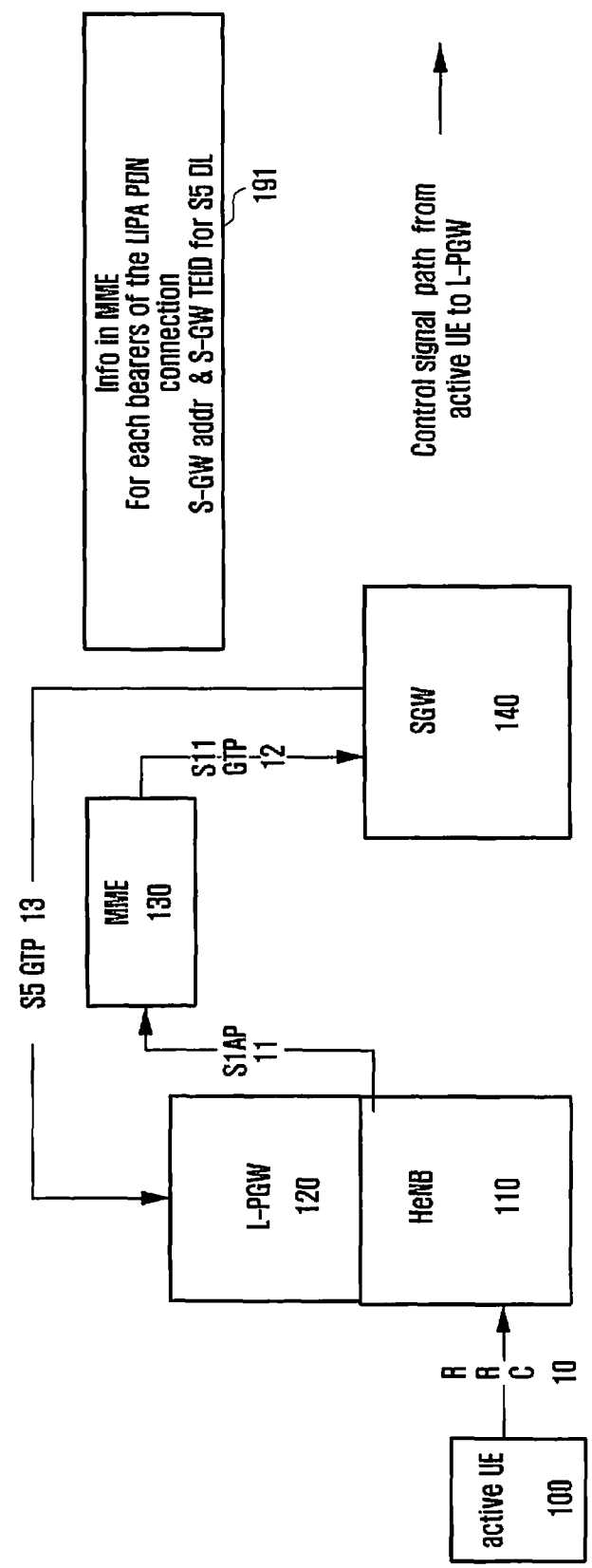
FIG. 16 is a diagram illustrating a control path established for a UE in an active mode to access an IP network in a system as illustrated in FIG. 14, according to an embodiment of the present invention.

FIG. 16 is a diagram illustrating a control path established for a UE in an active mode to access an IP network in a system as illustrated in FIG. 14.

Referring to FIG. 16, the UE 100 in an active mode transmits a control message to the L-PGW 120 through an RRC connection 10 established between the UE 100 and the HeNB 110.

The control message transmitted the UE 100 to the L-PGW 120 is delivered over the series of the RRC link between the UE 100 and the HeNB 110, the S1-AP interface 11 between the HeNB 110 and the MME 130, the S11 GTP interface 12 between the MME 130 and the SGW 140, and the S5 GTP interface 13 between the SGW 140 and the L-PGW 120. As described above for FIG. 15, the control message transmitted from the L-PGW 120 to the UE 100 is delivered over the reverse path.

Figure 17:
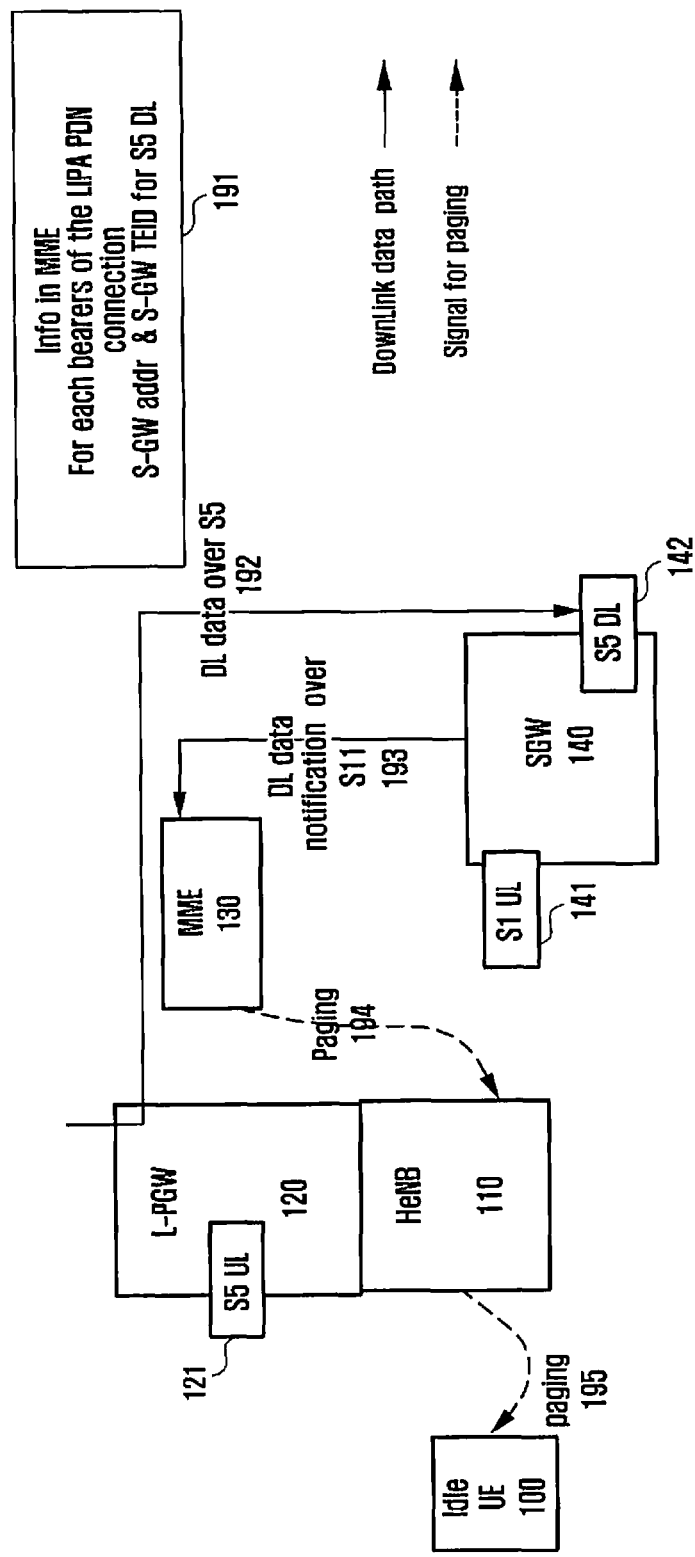
FIG. 17 is a diagram illustrating data and control paths established for a UE in an idle mode to access an IP network in a system as illustrated in FIG. 14, according to an exemplary embodiment of the present invention.

FIG. 17 is a diagram illustrating data and control paths established for a UE in an idle mode to access an IP network in a system as illustrated in FIG. 14, according to an embodiment of the present invention.

Referring to FIG. 17, when the UE 100 is operating in the idle mode, the HeNB 110 erases the UE information and bearer information (about S1 DL 101 and radio UL 111) for data communication with the UE 100. However, the HeNB 110 retains the information on the S1 UL 141 and S5 DL 142 in the SGW 140, the information on the S5 UL 121 in L-PGW 120, and the bearer information 191 in the MME 130.

If a DL data destined to the UE 100 operating in the idle mode arrives at the L-PGW 120, while the data and control paths for the UE 100 are established, the L-PGW 120 transmits the DL data 192 to the SGW 140 over the S5 DL 142. In this case, the SGW 140 transmits a DL data notification message 193 to the MME 130 while buffering the DL data 192.

If the DL data notification message 193 is received, the MME 130 transmits a paging trigger message 194 to the HeNB 110. Upon receipt of the paging trigger message 194, the HeNB 110 transmits a paging message 195 to UE 100, instructing the UE 100 to transition from the idle mode to the active mode.

Figure 18:
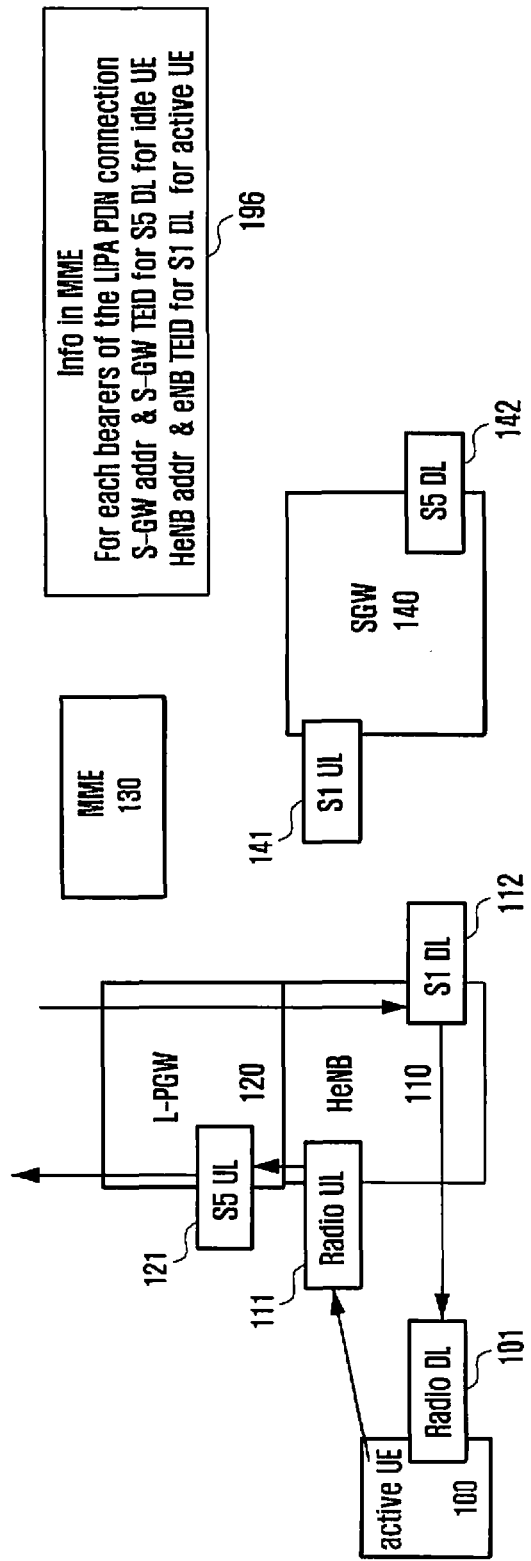
FIG. 18 is a diagram illustrating a data path established for a UE in an active mode to access an IP network in a system according to an embodiment of the present invention.

FIG. 18 is a diagram illustrating a data path established for a UE in an active mode to access an IP network in a system according to an embodiment of the present invention.

Referring to FIG. 18, the UL data transmitted from the UE 100 to the IP network 170 is delivered over a series of the radio UL 111 between the UE 100 and the HeNB 110, the S5 UL 121 between the HeNB 110 and the L-PGW 120, and an IP link between the L-PGW 120 and the IP network 170. Accordingly, the UL data can be delivered through the shortest data path.

The DL data at the L-PGW 120 is transmitted over the S1 DL between the L-PGW 120 and the HeNB 110 and the radio DL between the HeNB 110 and the UE 100, resulting in delivery over the shortest data path.

The MME 130 stores bearer information 196 including the information on the S1 DL for the UE 100 operating in the active mode in addition to information stored in the MME of FIG. 18. Also, the L-GW stores both S5 DL 142 for the idle UE and S1 DL 112 for the active UE, and switches which one is actually used when the UE state change from the idle state to active state and vice versa. For helping L-GW switching, the MME should give the indication to the L-GW about the change of the UE state.

Although the bearer information 196 of the MME 130 includes the information on the S5 DL and S1 DL for the data plane of the UE 100 in FIG. 18, the present invention is not limited thereto. Additionally, a procedure for configuring a data path of FIG. 18 will be described in more detail below with reference to FIG. 22.

Figure 19:
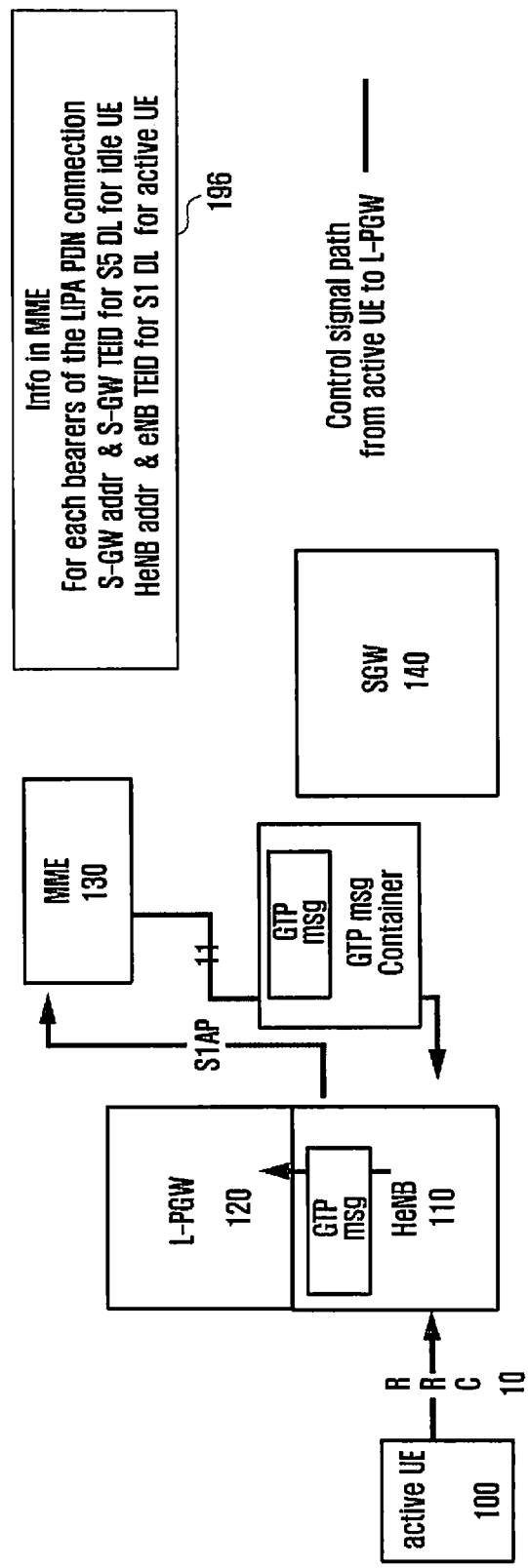
FIG. 19 is a diagram illustrating a control path established for a UE in an active mode to access an IP network in a system according to an embodiment of the present invention.

FIG. 19 is a diagram illustrating a control path established for a UE in an active mode to access an IP network in a system according to an embodiment of the present invention.

Referring to FIG. 19, the control message transmitted from the UE 100 to the MME 130 is delivered over a series of the RRC connection 10 between the UE 100 and the HeNB 110 and the S1-AP interface 11 between the HeNB 110 and the MME 130. The control message transmitted from the MME 130 to the L-PGW 120 is delivered over a series of the S1-AP interface between the MME 130 and HeNB 110 and an internal path between the HeNB 110 and the L-PGW 120 using a GTP message container.

Figure 20:
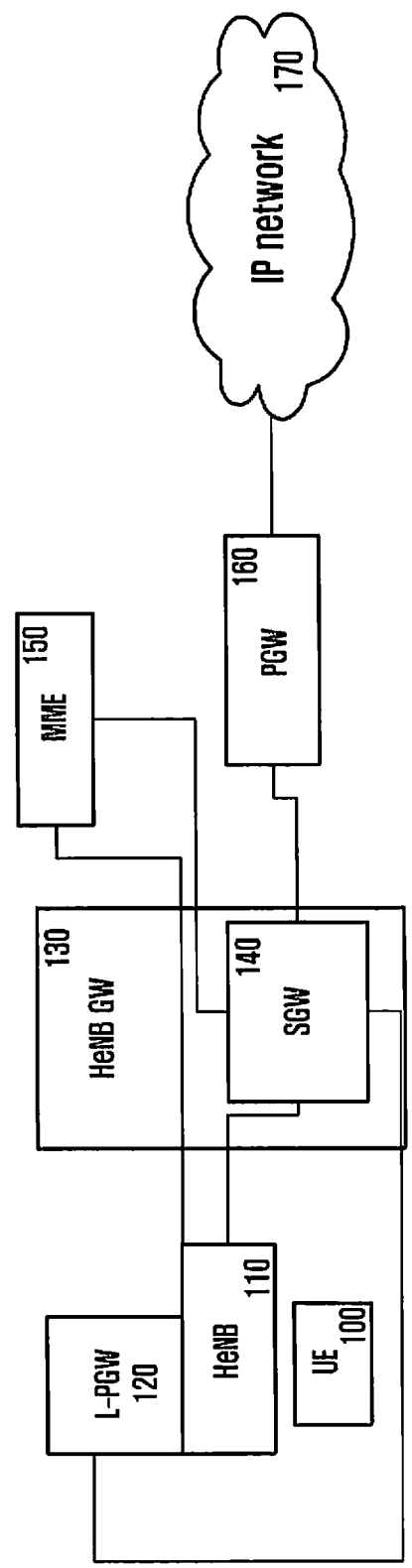
FIG. 20 is a diagram illustrating a network architecture of a wireless communication system including an HeNB according to an embodiment of the present invention.

FIG. 20 is a diagram illustrating a network architecture of a wireless communication system including an HeNB according to an embodiment of the present invention.

Referring to FIG. 20, the wireless communication system includes a UE 100, an HeNB 110 having extended functionality with an L-PGW 120, an HeNB GW 130, a macro (or serving) SGW 140, an MME 150, a macro (or PDN) PGW 160, and an IP network 170.

If the UE 100 operating in an active mode with a data path established as illustrated in FIG. 18 transitions to an idle mode, data path reconfiguration is performed with the paging process as described with reference to FIG. 17. Additionally, the data path reconfiguration procedure will be described in more detail below with reference to FIG. 22. Further, the data path reconfiguration according to the operation mode transition of the UE from the idle mode to the active mode will be described in more detail below with reference to FIG. 23.

Figure 21:
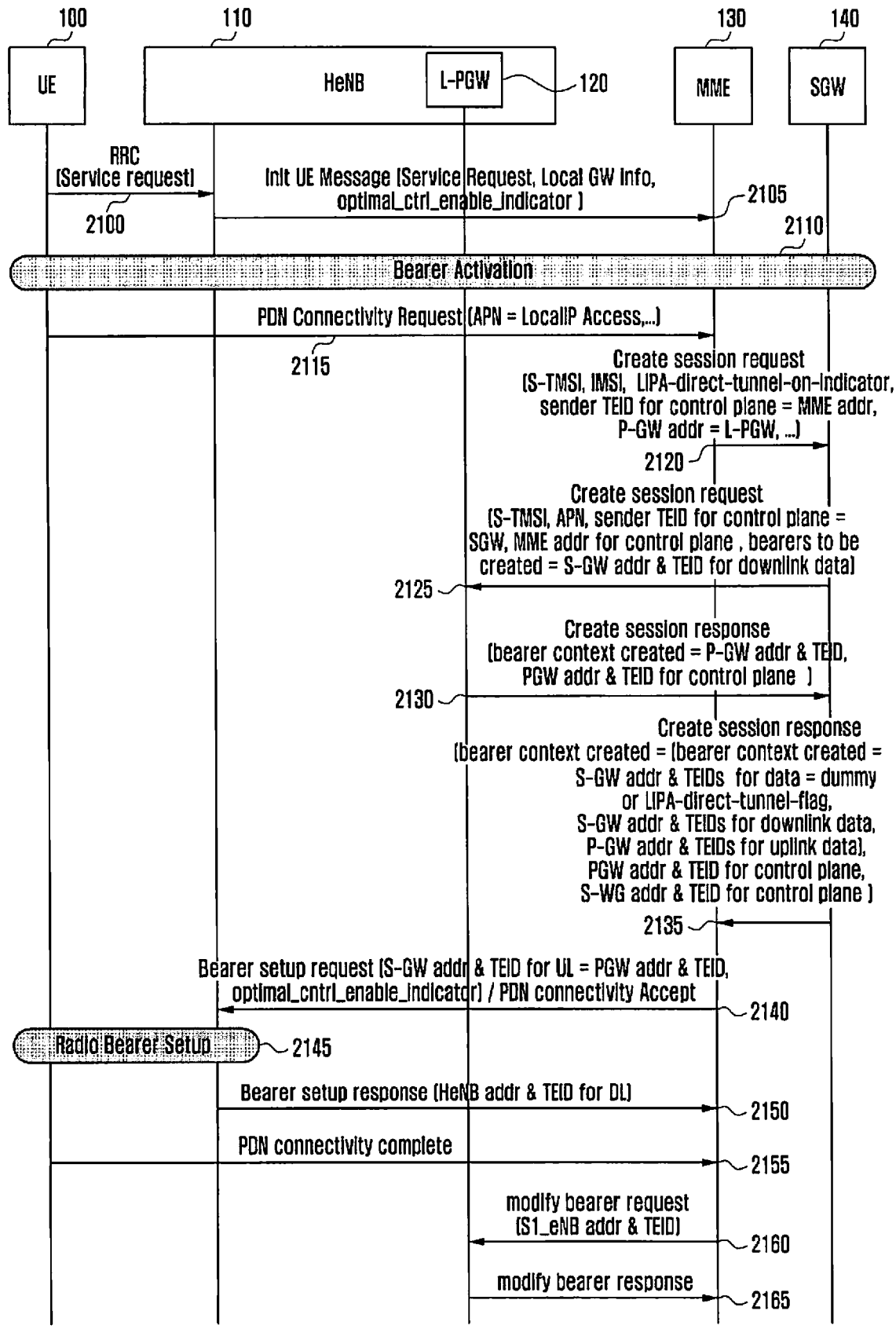
FIG. 21 is a signaling diagram illustrating operations of network entities for establishing a data path for a UE operating in an active mode in a system as illustrated in FIG. 20.

FIG. 21 is a signaling diagram illustrating operations of network entities for establishing a data path for a UE operating in an active mode in a system as illustrated in FIG. 20, according to an embodiment of the present invention.

Referring to FIG. 21, the UE 100 first establishes a Radio Resource Control (RRC) connection with the HeNB 110 and transmits a SERVICE REQUEST message to the HeNB 110 to establish a PDN connection for using the local IP access service in step 2100. In step 2105, the HeNB 110 transmits an INITIAL UE message including the SERVICE REQUEST message to the MME 130. The INITIAL UE message also includes the local GW information (Local GW-info) including the information on the L-PGW 120 of the HeNB 110 and an optimal control message enable indicator (optimal_ctrl_enable_indicator). The Local GW-info includes the access information such as the address for the L-PGW to receive control messages (IP address or Fully Qualified Domain Name (FQDN)) and GPRS Tunneling Protocol Tunnel End-point ID (TEID). The optimal_ctrl_enable_indicator indicates that the GTP control message transmitted from the MME 130 to the L-PGW 120 in the GTP message container over the control connection between the HeNB 110 and the MME (see FIG. 19) can be processed.

If the INITIAL UE message is received, the MME 130 activates all of the bearers used by the UE 100 in step 2110. Once the bearers are activated, the UE 100 transmits a PDN CONNECTIVITY REQUEST message to the MME 130 in step 2115. At this time, the Access Point Name (APN) of the PDN CONNECTIVITY REQUEST message, which indicates the target access network, is set to "Local IP Access".

Upon receipt of the PDN CONNECTIVITY REQUEST message, the MME 130 checks the APN to determine whether the target network is a Local IP network request and the Local GW-Info to determine whether the local IP access functions is supportable. For the decision, the MME checks the L-GW information in the initial UE message. (Other alternatives use DNS or S1 Setup procedures as illustrated in FIGS. 28, 29, 30, and 31). The MME 130 selects a PGW and/or SGW based on the checking result.

If it is determined to use the L-PGW 120 and if the Local GW-info includes an FQDN, the MME 130 acquires the IP address of the network using a Domain Name Server (DNS). If it is determined to use the L-PGW 120 and a LIPA direct path for connecting the data path of the UE in active mode to the L-PGW directly, the MME 130 transmits a CREATE SESSION REQUEST message containing the S-TMSI with IMSI to the SGW 140 in step 2120.

The SGW 140 recognizes the S-TMSI included in the CREATE SESSION REQUEST message as the indicator to use of the L-PGW. If the CREATE SESSION REQUEST message includes the S-TMSI, the SGW 140 forwards the CREATE SESSION REQUEST message to the L-PGW 120 in step 2125. At this time, the SGW 140 resets the UE ID by substituting the S-TMSI for the IMSI. Also, the SGW 140 recognizes the LIPA-direct-tunnel-on-indicator included in the CREATE SESSION REQUEST message transmitted by the MME 130 as an indicator indicating that there is no need for the SGW 140 to allocate resource to the UE 100 and thus does not allocates any resource for the data path. At this time, the S5 DL for use in idle mode or the resource for the data path required when the UE transitions from the active mode to the idle mode in step 2225 of FIG. 22 can be allocated.

After processing the received CREATE SESSION REQUEST message, the SGW 140 forwards the CREATE SESSION REQUEST message with the S-TMSI as the UE ID to the L-PGW 120 in step 2125.

Upon receipt of the CREATE SESSION REQUEST message, the L-PGW 120 allocates the required resource and transmits a CREATE SESSION RESPONSE message to the SGW 140 in step 2130. The SGW 140 forwards the CREATE SESSION RESPONSE message to the MME 130 in step 2135. At this time, if the any resource for the data transmission of the UE is not allocated, the SGW 140 sets the resource information (S1 UL 141 and S5 DL 142) to dummy data or turns on the LIPA-direct-tunnel-flag in the CREATE SESSION RESPONSE message.

Upon receipt of the CREATE SESSION RESPONSE message, the MME 130 transmits a BEARER SETUP REQUEST message to the HeNB 110 in step 2140. When the LIPA-direct-tunnel-flag is received, instead of the address of TEID of the SGW, the BEARER SETUP REQUEST message includes the address and TEID of the L-PGW 120 that are acquired from the CREATE SESSION RESPONSE message as the destination address for transmitting the data received through the radio UL 111 at the HeNB 110. When the MME 130 determines to use the GTP control message as the container for carrying the control message between the HeNB 110 and the MME 130, the MME inserts the optimal_cntrl_enable_indicator in the BEARER SETUP REQUEST message to indicate the use of the GTP control message. The BEARER SETUP REQUEST message can be transmitted along with a PDN connection accept message.

Upon receipt of the BEARER SETUP REQUEST and PDN CONNECTIVITY ACCEPT messages, the HeNB 110 sets up the radio bearer with the UE 100 in step 2145 and transmits a BEARER SETUP RESPONSE message containing the information on the S1 DL 112 allocated for receiving the DL data to the MME 130 in step 2150.

Upon receipt of the BEARER SETUP RESPONSE, the MME 130 saves the information on the S1 DL 112 for the HeNB 110 to receive the downlink data, and the UE transmits a PDN CONNECTIVITY COMPLETE message to the MME 130 in step 2155.

If both the BEARER SETUP RESPONSE message and the PDN CONNECTIVITY COMPLETE message are received, the MME 130 transmits a MODIFY BEARER REQUEST message including the information on the S1 DL 112 configured by the HeNB 110 to the control message reception address of the L-PGW 120, which is acquired from the CREATE SESSION RESPONSE message through steps 2130 and 2135, such that the data received from the L-PGW 120 is transmitted over the S1 DL in step 2160. The MODIFY BEARER REQUEST message can be transmitted in three ways. The first way uses the container over the control connection between the HeNB 110 and the MME 130. The second way uses an L-GW control address obtained using UE initial message, S1 setup message, or DNS query, i.e., by sending the MODIFY BEARER REQUEST directly to L-GW control address. The third way is via SGW, i.e., the MME sends the MODIFY BEARER REQUEST to S-GW with the LIPA-direct-tunnel-flag and then the S-GW just passes the received MODIFY BEARER REQUEST to L-GW without processing.

If the MODIFY BEARER REQUEST message is received, the L-PGW 120 saves the information on the S1 DL allocated by the HeNB 110 and establishes an LIPA direct tunnel as described with reference to FIG. 18 and in step 2165, forwards the MODIFY BEARER RESPONSE message to the control message reception address of the MME 130 that is acquired from the CREATE SESSION REQUEST message through steps 2120 and 2125. Sending the MODIFY BEARER RESPONSE also can be done in the three ways; using the GTP-C container over S1-MME interface, using L-GW control address, or using S-GW passing.

Figure 22:
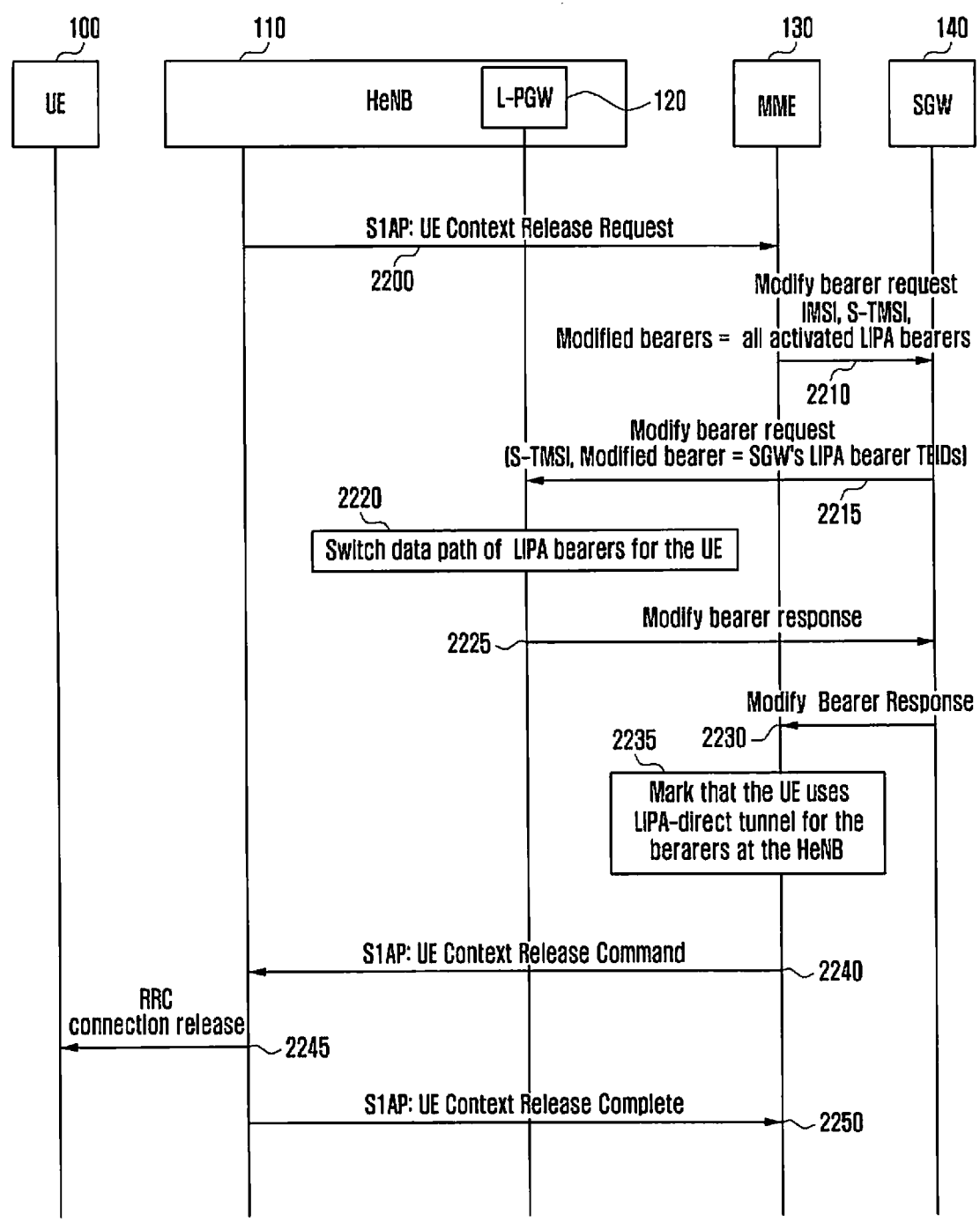
FIG. 22 is a signaling diagram illustrating operations of network entities when reconfiguring a data path for a UE to receive a paging message, after transitioning to an idle mode, according to an embodiment of the present invention.

FIG. 22 is a signaling diagram illustrating operations of network entities when reconfiguring a data path for a UE to receive a paging message, after transition to an idle mode, according to an embodiment of the present invention.

Referring to FIG. 22, if the UE 100 transitions from the active mode to the idle mode (e.g., according to a reason such as inactivity), the HeNB 110 transmits a UE CONTEXT RELEASE REQUEST message to the MME 130 for releasing the context of the UE in step 2200.

If the UE CONTEXT RELEASE REQUEST message is received, the MME 130 transmits a MODIFY BEARER REQUEST message to the SGW 140 for switching the downlink data path from the S1 DL 112 between the L-PGW 120 and the HeNB 110 (see FIG. 18) to the S5 DL 142 between L-PGW and the SGW 140 (see FIG. 17) in step 2210. The SGW 140 forwards the MODIFY BEARER REQUEST message to the L-PGW 120 in step 2215. Additionally, the MODIFY BEARER REQUEST can be delivered within a container in S1AP:UE Context Release Command from in FIG. 22.

The MODIFY BEARER REQUEST message transmitted by the MME 130 contains the S-TMSI for indicating that the data path of the bearers used for a Local IP Access (LIPA) direct tunnel is switched. The MODIFY BEARER REQUEST message also includes the most recent bearer-related information, such as deactivation, activation, and modification of the bearers, that has been executed without notification to the SGW 140 for control message transmission efficiency so as to update the information on the bearers in the SGW 140.

More specifically, if the MODIFY BEARER REQUEST message is received, the SGW 140 checks the S-TMSI included in the MODIFY BEARER REQUEST message to recognize the path switch of the LIPA direct tunnel and allocates the resource for receiving and buffering the downlink data destined to the UE 100 using the information on the modified bearers extracted from the MODIFY BEARER REQUEST message. Additionally, the SGW 140 updates its bearer information. If the MME 130 has not allocated resources for the uplink and downlink data when it has received the CREATE SESSION REQUEST in step 2120 of FIG. 21, a resource such as a TEID at a time point when the MODIFY BEARER REQUEST message is received can be allocated in the state where the UE transitions to the idle mode. In this case, the MODIFY BEARER REQUEST message transmitted by the SGW 140 includes the information on the modified bearers as the update result.

Upon receipt of the MODIFY BEARER REQUEST message, the L-PGW 120 switches the downlink data path from the S1 DL 112 established between the L-PGW 120 and the HeNB 110 to the S5 DL 142 between the L-PGW 120 and the SGW 140 based on the bearer information of the SGW 140 extracted from the MODIFY BEARER REQUEST message in step 2220. In step 2225, the L-PGW 120 transmits a MODIFY BEARER RESPONSE message including the data path switching result to the SGW 140. The SGW 140 forwards the MODIFY BEARER REQUEST message to the MME 130 in step 2230.

If the MODIFY BEARER RESPONSE message is received, the MME 130 saves the UE context indicating that the UE camped on the HeNB 110 uses the LIPA-direct-tunnel for the bearers at the HeNB in step 2235. In step 2240, the MME 130 transmits a UE CONTEXT RELEASE COMMAND message to the HeNB 110 for releasing the resources and information and the radio bearers allocated to the UE 100. Upon receipt of the UE CONTEXT RELEASE COMMAND message, the HeNB 110 transmits an RRC CONNECTION RELEASE message to the UE 100 in step 2245 and releases the resource allocated to the UE 100. In step 2250, the HeNB 110 transmits a UE CONTEXT RELEASE COMPLETE message including the resource release result to the MME 130.

Figure 23:
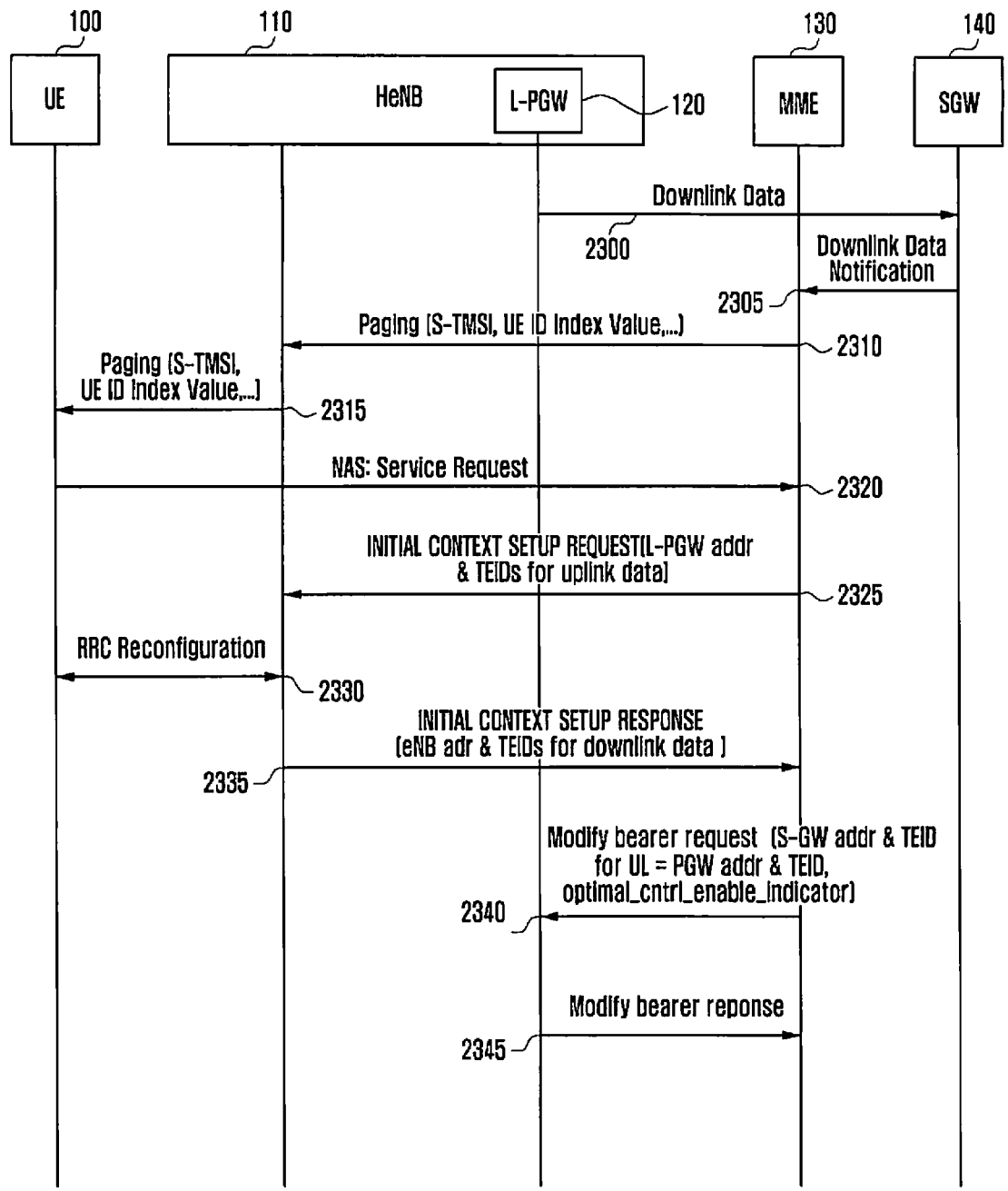
FIG. 23 is a signaling diagram illustrating operations of network entities when a UE receives a paging message. after transition to an idle mode, according to an embodiment of the present invention.

FIG. 23 is a signaling diagram illustrating operations of network entities when a UE receives a paging message, after transition to an idle mode, according to an embodiment of the present invention.

Referring to FIG. 23, if the downlink data destined for the UE 100 arrives at the L-PGW 120, the L-PGW 120 transmits the downlink data to the SGW 140 in step 2300. The SGW 140 transmits a DOWNLINK DATA NOTIFICATION message to the MME 130 in step 2305 while buffering the downlink data. Upon receipt of the DOWNLINK DATA NOTIFICATION message, the MME 130 transmits a PAGING message to the eNBs within a tracking area defined according to the location of the UE 100 in step 2310. If the PAGING message is received, the HeNB 110 broadcasts the PAGING message over a paging channel in step 2315.

If the PAGING message is received, the UE 100 transmits a SERVICE REQUEST message to the MME 130 for receiving the downlink data in step 2320. In step 2325, the MME 130 transmits an INITIAL CONTEXT SETUP REQUEST message to the HeNB 110. The INITIAL CONTEXT SETUP REQUEST message includes the information on the S5 UL 111 to be used for transmission of uplink data to the L-PGW 120. In step 2330, the HeNB 110 establishes the UE context and reconfigures RRC connection with the UE 100. The HeNB 110 stores the information on the S5 UL 111 extracted from the INITIAL CONTEXT SETUP REQUEST message such that the uplink data received over the reconfigured radio bearer can be transmitted to the L-PGW through the S5 UL 111 between the HeNB 110 and the L-PGW 120.

After allocating the S1 DL 112 with a TEID for receiving the downlink data, the HeNB 110 transmits an INITIAL CONTEXT SETUP RESPONSE message including the S1 DL allocation and Radio bearer allocation results to the MME 130 in step 2335. In step 2340, the MME 130 transmits a MODIFY BEARER REQUEST message to the control message address of the L-PGW 120 that is extracted from the CREATE SESSION RESPONSE message received in step 2130 of FIG. 21. The MODIFY BEARER REQUEST message may include the information on the S1 DL 112 between the L-PGW 120 and the HeNB 110 that is extracted from the INITIAL CONTEXT SETUP RESPONSE message received in step 2335 so as to establish the LIPA direct tunnel for the downlink data, as illustrated in FIG. 18. As illustrated in FIGS. 21 and 22, the modify bearer request can be sent via S-GW with LIPA-direct-tunnel-flag or using the container in INITIAL CONTEXT SETUP REQUEST message 2325.

Upon receipt of the MODIFY BEARER REQUEST message, the L-PGW 120 configures the LIPA direct tunnel and transmits a MODIFY BEARER RESPONSE message including the LIPA direct tunnel configuration result to the MME 130 in step 2345.

Figure 24:
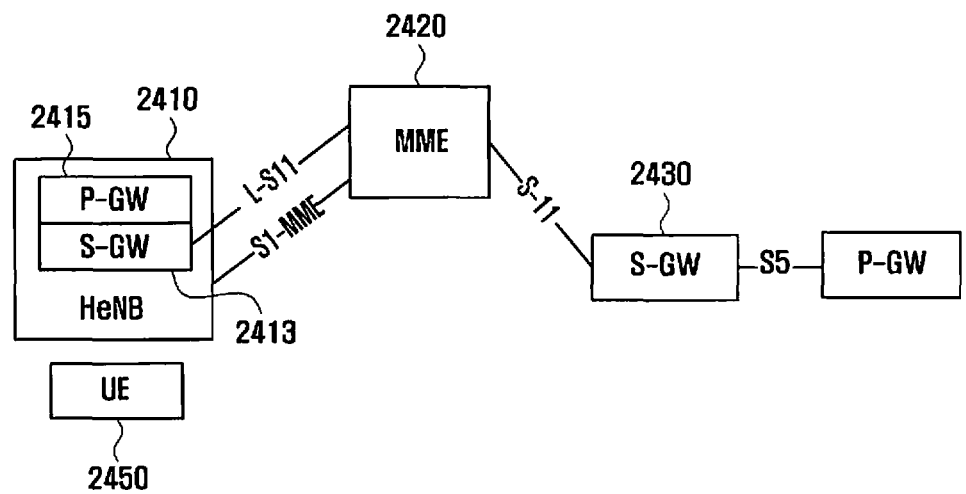
FIG. 24 is a diagram illustrating a wireless communication system including a femto base station (i.e., an HeNB) with extended functionality by incorporating a PDN gateway (i.e., L-PGW) and a serving gateway (i.e., L-SGW) according to an embodiment of the present invention.

FIG. 24 is a diagram illustrating a wireless communication system including a femto base station (or HeNB) with extended functionality by incorporating a Local PDN GateWay (L-PGW) and a Local Serving GateWay (L-SGW) according to an embodiment of the present invention.

Referring to FIG. 24, the HeNB 2410 is assigned an IP address using the DHCP or static configuration and establishes a connection with an MME 2420. In order to establish the connection with the MME 2420, the HeNB 2410 transmits an S1 SETUP REQUEST message including its ID to the MME 2420 and receives a response from the MME 2410.

After establishing a connection between the HeNB 2410 and the MME 2420, the UE 2450 transmits a SERVICE REQUEST message to the HeNB 2410. The HeNB 2410 transmits an INITIAL UE message to the MME 2420 for notifying of the receipt of the SERVICE REQUEST message and acquiring the information on the UE 2450. The INITIAL UE message includes local gateway information (Local GW-info) including IPv4 and/or IPv6 addresses and ports of the L-PGW 2415 and the L-SGW 2413 for exchanging the control messages.

Figure 25:
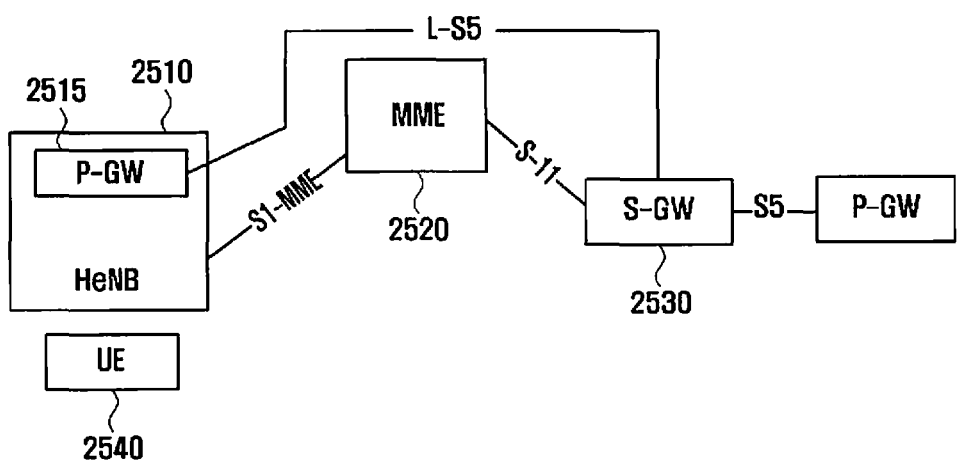
FIG. 25 is a diagram illustrating a wireless communication system including an HeNB with extended functionality by incorporating a PDN gateway (i.e., L-PGW) according to an embodiment of the present invention.

FIG. 25 is a diagram illustrating a wireless communication system including an HeNB with extended functionality by incorporating a Local PDN GateWay (L-PGW) according to an embodiment of the present invention.

Referring to FIG. 25, the HeNB 2510 includes an L-PGW 2515, and the MME 2520 transmits a message to the L-PGW 2510 via the SGW 2530.

Figure 26:
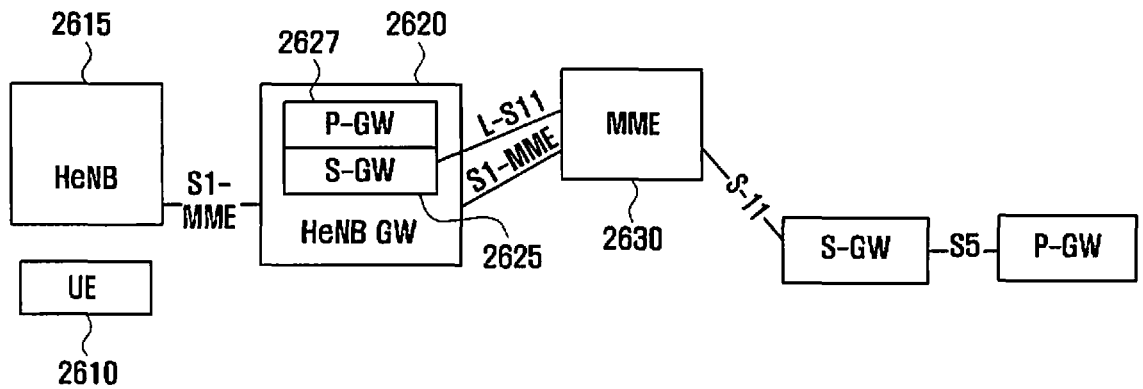
FIG. 26 is a diagram illustrating a wireless communication system including an HeNB GateWay (GW) with extended functionality by incorporating a PDN gateway (i.e., L-PGW) and a serving gateway (i.e., L-SGW) according to an embodiment of the present invention.

FIG. 26 is a diagram illustrating a wireless communication system including an HeNB GW with extended functionality by incorporating an L-PGW and an L-SGW according to an embodiment of the present invention. In the system illustrated in FIG. 26, the L-PGW 2627 and L-SGW 2625 are activated in the HeNB GW 2620 when the UE is in an active mode.

Referring to FIG. 26, the uplink data transmitted from the UE 2610 to an IP network is delivered over the series of ULs, a radio UL established between the UE 2610 and the HeNB 2615, an S1 UL between the HeNB 2615 and the L-SGW 2625 of the HeNB GW 2620, and S5 UL between the L-SGW 2625 and the L-PGW 2627, and an IP link between the L-SGW 2625 and the IP network.

Further, the downlink data is delivered from the L-PGW 2627 over a series of DLs, the S5 DL between the L-PGW 2627 and the L-SGW 2625, the S1 DL between the L-SGW 2625 and the HeNB 2615, and the radio UL between the HeNB 2615 and the UE 2610.

Figure 27:
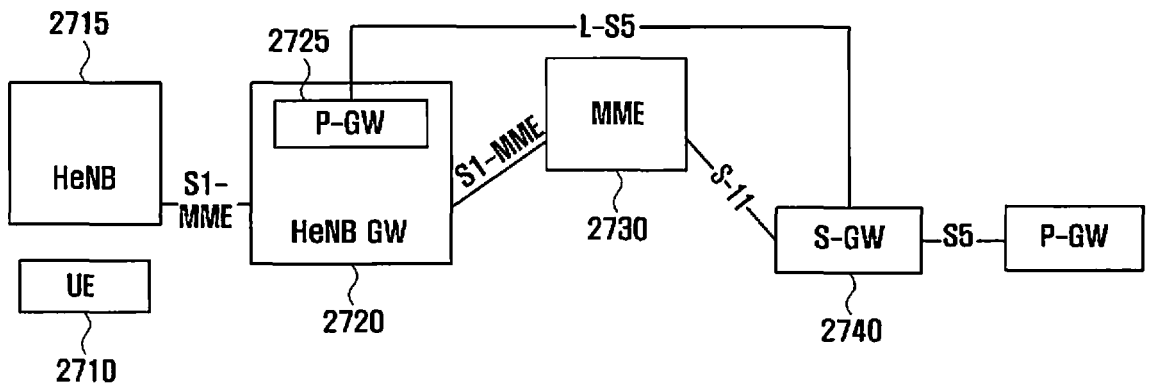
FIG. 27 is a diagram illustrating a wireless communication system including an HeNB GW with extended functionality by incorporating a PDN gateway (i.e., L-PGW) according to an embodiment of the present invention.

FIG. 27 is a diagram illustrating a wireless communication system including an HeNB GW with extended functionality by incorporating an L-PGW according to an embodiment of the present invention. In the system illustrated in FIG. 27, the L-PGW function is activated in the HeNB GW 2720 when the UE 2710 is in an idle mode.

Referring to FIG. 27, if downlink data destined for the UE 2710 arrives at the L-PGW 2725, the L-PGW 2725 transmits the downlink data to the SGW 2740. The SGW 2740 transmits a downlink data notification message to the MME 2730 while buffering the downlink data. Upon receipt of the downlink data notification message, the MME 2730 transmits a paging message to the eNBs in the tracking area, which is defined according to the location of the UE 2710. If the paging message is received, the HeNB 2715 broadcasts the paging message such that the UE 2710 receives the paging message.

Upon receipt of the paging message, the UE 2710 transmits a SERVICE REQUEST message to the MME 2730. If the SERVICE REQUEST message is received, the MME 2730 transmits an INITIAL CONTEXT SETUP REQUEST message to the HeNB GW 2720. The INITIAL CONTEXT SETUP REQUEST message includes information on the S5 UL for transmitting the uplink data to the L-PGW 2720. The HeNB GW 2720 establishes the UE context and sets up radio bearers with the UE 2710. The HeNB GW 2720 saves the information on the S5 UL of the L-PGW 2725 so as to transmit the uplink data received over the radio bears to the L-PGW 2725.

FIG. 28 is a signaling diagram illustrating operations of an HeNB/HeNB GW with expended functionality by incorporating an L-PGW and an L-SGW and the MME for managing information in a wireless communication system, according to an embodiment of the present invention.

The HeNB/HeNB GW is allocated an IP address according to the DHCP or static configuration and establishes a connection with the MME. More specifically, the HeNB/HeNB GW transmits an S1 SETUP REQUEST message including local gateway information (Local GW-info) including IPv4 and/or IPv6 addresses and ports of the L-PGW and the L-SGW to the MME in step 2800. If the S1 SETUP REQUEST message is received, the MME stores the UE information including the S-TMSI as the UE ID for identifying the UE between the HeNB/HeNB GW and the MME and the Local GW-info in step 2810. In step 2820, the MME transmits an S1 SETUP RESPONSE message including the information required for establishing the radio bearer between the UE and the HeNB/HeNB GW to the HeNB/HeNB GW. When both the HeNB and the HeNB GW have the L-GW functionality, the HeNB GW may include several HeNB's L-GW info in its S1 Setup Request message.

Figure 29:
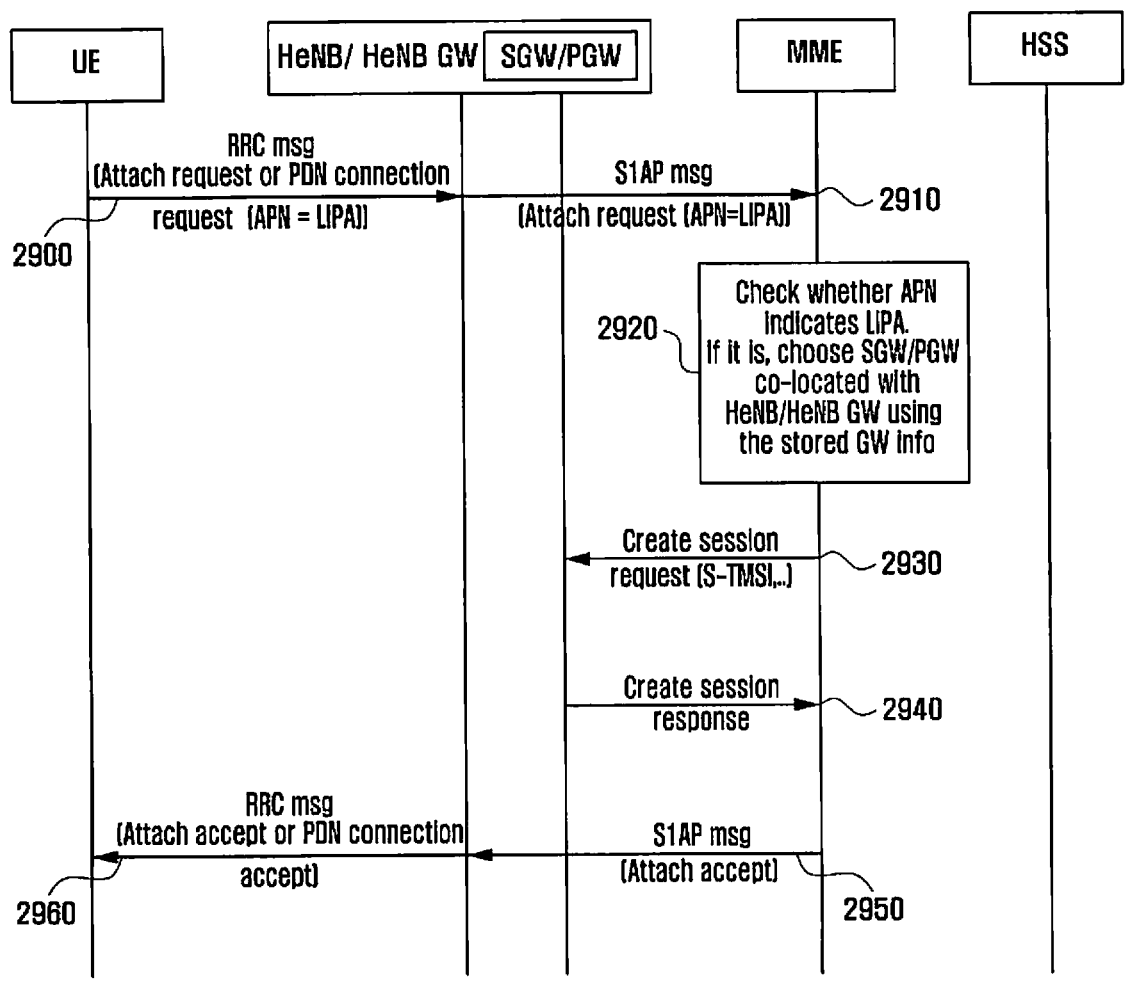
FIG. 29 is a signaling diagram illustrating operations of network entities for selecting a gateway to which data is transmitted using stored local gateway information in a wireless communication system according to an embodiment of the present invention.

FIG. 29 is a signaling diagram illustrating operations of network entities for selecting a gateway to which data is transmitted using stored local gateway information in a wireless communication system according to an embodiment of the present invention.

Referring to FIG. 29, a UE first transmits a SERVICE REQUEST message (RRC message) to the HeNB/HeNB GW in step 2900. The HeNB/HeNB GW forwards the SERVICE REQUEST message to the MME in step 2910. The SERVICE REQUEST message transmitted to the MME includes information on a local gateway in the HeNB/HeNB GW. The local gateway information includes access information such as a control message reception address (IP address or FQDN) of the L-PGW and a TEID (GPRS Tunnel Protocol Tunnel End-point ID).

Upon receipt of the SERVICE REQUEST message, the MME activates all of the bearers used by the UE. Thereafter, the UE transmits a PDN CONNECTIVITY REQUEST message for requesting the activation of the local IP access service to the MME. The PDN CONNECTIVITY REQUEST message includes an Access Point Name (APN) indicating "Local IP access". The APN indicates the target access network. The MME checks whether the APN indicates the Local IP Access (LIPA) and, if it does, chooses SGW/PGW co-located with the HeNB/HeNB GW using the stored local GW-info in step 2920.

In step 2930, the MME transmits a CREATE SESSION REQUEST message to the SGW/PGW. The CREATE SESSION REQUEST message includes an S-TMSI as a temporary UE ID and a LIPA-direct-tunnel-on-indicator. In response to the CREATE SESSION REQUEST message, the SGW/PGW transmits a CREATE SESSION RESPONSE message to the MME in step 2940. In step 2950, the MME transmits a SERVICE RESPONSE message to the HeNB/HeNB GW in response to the SERVICE REQUEST message. The HeNB/HeNB GW forwards the SERVICE RESPONSE message to the UE in step 2960.

Figure 30:
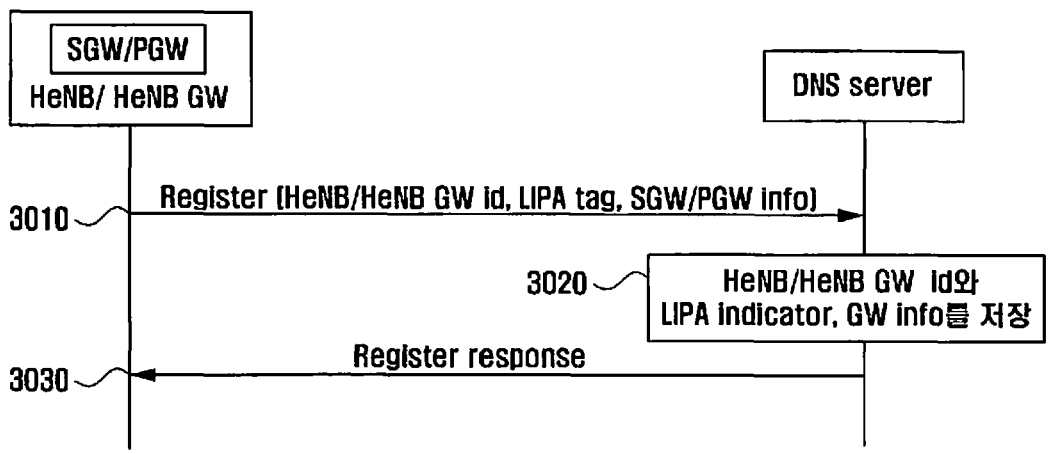
FIG. 30 is a signaling diagram illustrating operations of an HeNB/HeNB GW and a DNS server for a femto base station information acquisition in a wireless communication system according to an embodiment of the present invention.

FIG. 30 is a signaling diagram illustrating operations of an HeNB/HeNB GW and a DNS server for a femto base station information acquisition in a wireless communication system according to an embodiment of the present invention.

Referring to FIG. 30, the HeNB/HeNB GW transmits a REGISTER REQUEST message for registration of local gateway information to a Domain Name Service (DNS) server in step 3010. The DNS server provides host names mapped to IP addresses. The local gateway information includes information such as IPv4 and/or IPv6 address and ports of the L-PGW and L-SGW co-located with the HeNB/HeNB GW. If the REGISTER REQUEST message is received, the DNS server stores the HeNB Id, namely ECGI and the local gateway information in step 3020. In step 3030, the DNS server transmits a REGISTER RESPONSE message indicating the registration of the local gateway information to the HeNB/HeNB GW.

Figure 31:
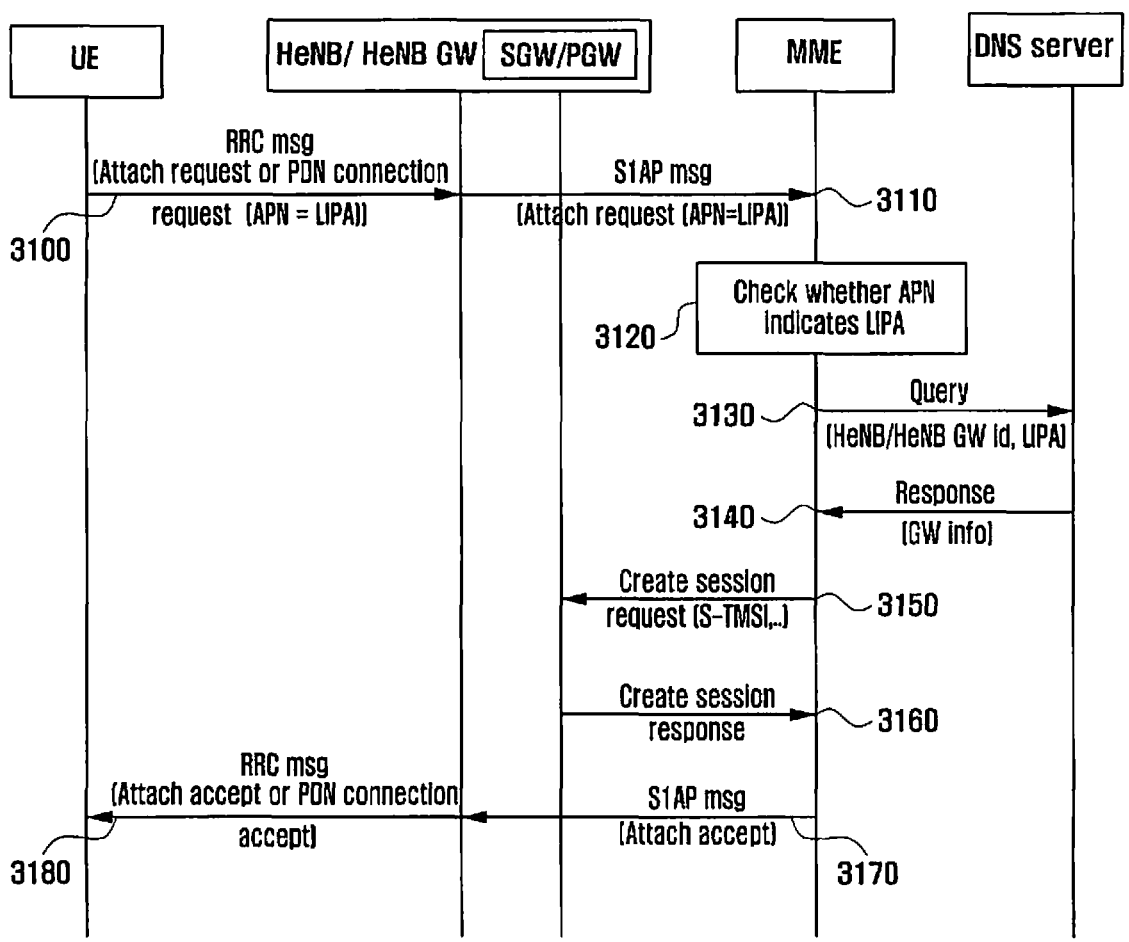
FIG. 31 is a signaling diagram illustrating operations of network entities for choosing an HeNB/HeNB GW in a wireless communication system according to an embodiment of the present invention.

FIG. 31 is a signaling diagram illustrating operations of network entities for choosing an HeNB/HeNB GW in a wireless communication system according to an embodiment of the present invention.

Referring to FIG. 31, a UE first transmits a SERVICE REQUEST message to the HeNB/HeNB GW in step 3100. The HeNB/HeNB GW forwards the SERVICE REQUEST message to the MME in step 3110. The SERVICE REQUEST message transmitted to the MME includes the ECGI (eNB cell global id).

Upon receipt of the SERVICE REQUEST message, the MME activates all of the bearers used by the UE. Thereafter, the UE transmits a PDN CONNECTIVITY REQUEST message for requesting activation of the local IP access service to the MME. The PDN CONNECTIVITY REQUEST message includes the APN indicating "Local IP Access".

The MME checks whether the APN indicates "Local IP Access (LIPA)" in the PDN CONNECTIVITY REQUEST message in step 3120. The procedure in FIG. 30 registers the L-GW's info matching with the ECGI to DNS Server. Therefore, the MME obtains the L-GW information by sending the query to DNS server. Accordingly, in step 3130, the MME transmits a Query message to the DNS server for requesting the information on the selected HeNB/HeNB GW.

Upon receipt of the Query message, the DNS server retrieves the information on the corresponding HeNB/HeNB GW and transmits a Response message to the MME in step 3140. If the Response message is received from the DNS server, the MME transmits a CREATE SESSION REQUEST message to the L-SGW/L-PGW of the HeNB/HeNB GW in step 3150. The CREATE SESSION REQUEST message includes an S-TMSI as a temporary UE ID and a LIPA-direct-tunnel-on-indicator. In step 3160, the L-SGW/L-PGW of the HeNB/HeNB GW transmits a CREATE SESSION RESPONSE message to the MME.

Upon receipt of the CREATE SESSION RESPONSE message, the MME transmits a SERVICE RESPONSE message to the HeNB/HeNB GW in response to the SERVICE REQUEST message in step 3170. The HeNB/HeNB GW forwards the SERVICE RESPONSE message to the UE in step 3180.

Accordingly, when the UE requests for the Local IP access, the HeNB/HeNB GW activates the local gateway function (L-PGW with or without L-SGW) in order to exchange data with the IP network without passing through a core network, resulting in improved data transmission efficiency. By using the relay function and security function of the local gateway in the HeNB/HeNB GW, it is possible to improve the security of the communication between the HeNB/HeNB GW and the MME belonged to the core network. The HeNB/HeNB GW notifies the MME of the activation of the local IP access function such that the MME supports the UE in active mode to use a LIPA direct tunnel of UE-HeNB/HeNB GW-L-PGW in HeNB/HeNB GW, resulting in optimization of the data and control paths.

When the MME uses a LIPA direct tunnel, the MME notifies the serving gateway of the LIPA direct tunnel use, such that the serving gateway does not allocate any resources, particularly resources for the uplink data, to the UE in an active mode. This prevents the wasting of resources in the serving gateway.

When the UE operating in the active mode transitions to the idle mode, the data path is switched from a LIPA direct tunnel to a link of a serving gateway-local PDN gateway in an HeNB/HeNB GW to enable the paging process.

When the HeNB includes the local PDN gateway function for supporting the Local IP access function, it is possible to provide the UE with the efficient data path of a UE-HeNB-local PDN gateway in an HeNB, regardless of the location of the SGW.

When the UE is operating in the idle mode, it is possible to receive data and prevent security information of the UE from being exposed to the HeNB by using an S-TMSI as a temporary UE ID in the message transmitted to the local PDN gateway in the HeNB.

Although certain embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims and their equivalents.

What is claimed is:

1. A method for supporting local internet protocol access (LIPA) at a home enhanced node base station (HeNB) collocated with a local gateway (LGW) in a wireless communication system, the method comprising:

receiving, from a terminal, a first request message; transmitting, to a mobility management entity (MME), a first control message including an address of the LGW via an S1-MME interface for the terminal, wherein the address of the LGW is used to select a packet data network gateway (PDN GW) by the MME;

receiving, from the MME, a second control message in response to the first control message, the second control message including an identification (ID) set equal to a tunnel endpoint identifier (TEID) of the selected PDN GW, wherein the tunnel endpoint identifier (TEID) is for an S5 tunnel of a general packet radio service (GPRS) tunnel protocol (GTP) interface;

establishing a direct path between the HeNB and the LGW based on the ID set equal to the TEID of the selected PDN GW; and forwarding an uplink data packet received from the terminal to the LGW via the direct path,
wherein a request message transmitted from the MME to a serving gateway (SGW) comprises the address of the LGW.

2. A method for supporting local internet protocol access (LIPA) at mobility management entity (MME) in a wireless communication system, the method comprising:
receiving, from a home enhanced node base station (HeNB) collocated with a local gateway (LGW), a first control message including an address of the LGW via an S1-MME interface, wherein the address of the LGW is used to select a packet data network gateway (PDN GW);
transmitting, to a serving gateway (SGW), a request message comprising the address of the LGW; and
transmitting, to the HeNB, a second control message in response to the first control message, the second control message including an identification (ID) set equal to a tunnel endpoint identifier (TEID) of the selected PDN GW, wherein the tunnel endpoint identifier (TEID) is for an S5 tunnel of a general packet radio service (GPRS) tunnel protocol (GTP) interface,
wherein a direct path between the HeNB and the LGW is established based on the ID set equal to the TEID of the selected PDN GW, and
wherein the direct path is used to forward an uplink data packet from the HeNB to the LGW.

3. A home enhanced node base station (HeNB) for supporting local internet protocol access (LIPA) collocated with a local gateway (LGW), the HeNB comprising:
a transceiver configured to transceive signals with a base station; and
a controller configured to control the transceiver, to receive, from a terminal, a first request message, to transmit, to a mobility management entity (MME), a first control message including an address of the LGW via an S1-MME interface for the terminal, wherein the address of the LGW is used to select a packet data network gateway (PDN GW) by the MME, to receive, from the MME, a second control message in response to the first control message, the second control message including an identification (ID) set equal to a tunnel endpoint identifier (TEID) of the selected PDN GW, wherein the tunnel endpoint identifier (TEID) is for an S5 tunnel of a general packet radio service (GPRS) tunnel protocol (GTP) interface, to establish a direct path based on the ID set equal to the TEID of the selected PDN GW, and to forward an uplink data packet received from the terminal to the LGW via the direct path,
wherein a request message transmitted from the MME to a serving gateway (SGW) comprises the address of the LGW.

4. A mobility management entity (MME) for supporting local internet protocol access (LIPA), the MME comprising:
a transceiver configured to transceive signals with a base station; and
a controller configured to control the transceiver, to receive, from a home enhanced node base station (HeNB) collocated with a local gateway (LGW), a first control message including an address of the LGW via an S1-MME interface, wherein the address of the LGW is used to select a packet data network gateway (PDN GW), to transmit, to a serving gateway (SGW), a request message comprising the address of the LGW, and to transmit, to the HeNB, a second control message in response to the first control message, the second control message including an identification (ID) set equal to a tunnel endpoint identifier (TEID) of the selected PDN GW, wherein the tunnel endpoint identifier (TEID) is for an S5 tunnel of a general packet radio service (GPRS) tunnel protocol (GTP) interface,
wherein a direct path between the HeNB and the LGW is established based on the ID set equal to the TEID of the selected PDN GW, and
wherein the direct path is used to forward an uplink data packet from the HeNB to the LGW.

5. A method for supporting local internet protocol access (LIPA) at a local gateway (LGW) collocated with a home enhanced node base station (HeNB) in a wireless communication system, the method comprising:
receiving, by the LGW, a downlink data packet for a terminal;
buffering, by the LGW, the received downlink data packet;
identifying whether the terminal is in an idle state; transmitting, by the LGW, if the terminal is in the idle state, the received downlink data packet to a serving gateway (SGW) to page the terminal; and
forwarding, by the LGW, to the HeNB, if the terminal enters a connected mode, the buffered downlink data packet on a direct path established by the HeNB between the HeNB and the LGW based on an identification (ID),
wherein the ID received at the HeNB from a mobile management entity (MME) is set equal to a tunnel endpoint identifier (TEID) of a packet data network gateway (PDN GW), wherein the tunnel endpoint identifier (TEID) is for an S5 tunnel of a general packet radio service (GPRS) tunnel protocol (GTP) interface, and
wherein the PDN GW is selected by the MME based on an address of the LGW.

6. The method of claim 5, wherein the SGW triggers a mobility management entity (MME) to page the terminal based on the forwarded downlink data packet.

7. A local gateway (LGW) collocated with a home enhanced node base station (HeNB), the LGW comprising:
a transceiver configured to transceive signals with a base station; and
a controller configured to control the transceiver, to receive a downlink data packet for terminal, to buffer the received downlink data packet, to identify whether the terminal is in an idle state, to transmit the received downlink data packet to a serving gateway (SGW) to page the terminal if the terminal is in the idle state and to forward, if the terminal enters a connected mode, to the HeNB, the buffered downlink data packet on a direct path established by the HeNB between the HeNB and the LGW based on an identification (ID),
wherein the ID received at the HeNB, from a mobility management entity (MME), is set equal to a tunnel endpoint identifier (TEID) of a packet data network gateway (PDN GW), wherein the tunnel endpoint identifier (TEID) is for an S5 tunnel of a general packet radio service (GPRS) tunnel protocol (GTP) interface, and
wherein the PDN GW is selected by the MME based on an address of the LGW.

8. The LGW of claim 7, wherein the SGW triggers a mobility management entity (MME) to page the terminal based on the forwarded downlink data packet.

* * * * *